US007173065B2

(12) United States Patent
Ludemann et al.

(10) Patent No.: US 7,173,065 B2
(45) Date of Patent: Feb. 6, 2007

(54) THERMALLY DEVELOPABLE MATERIALS WITH IMPROVED CONDUCTIVE LAYER

(75) Inventors: Thomas J. Ludemann, Maplewood, MN (US); Gary E. LaBelle, Stillwater, MN (US); Roland J. Koestner, Penfield, NY (US); Samuel Chen, Penfield, NY (US)

(73) Assignee: Eastman Kodak Company, Rochester, NY (US)

( * ) Notice: Subject to any disclaimer, the term of this patent is extended or adjusted under 35 U.S.C. 154(b) by 0 days.

(21) Appl. No.: 11/388,917

(22) Filed: Mar. 24, 2006

(65) Prior Publication Data

US 2006/0166151 A1 Jul. 27, 2006

Related U.S. Application Data

(62) Division of application No. 10/978,205, filed on Oct. 29, 2004, now Pat. No. 7,067,242.

(51) Int. Cl.
*B01F 17/00* (2006.01)
*B01F 3/08* (2006.01)
*B01F 3/12* (2006.01)
*C09K 3/00* (2006.01)

(52) U.S. Cl. ........................................... 516/36; 516/33

(58) Field of Classification Search .................. 516/33, 516/36; 430/527, 530
See application file for complete search history.

(56) References Cited

U.S. PATENT DOCUMENTS

| | | | | |
|---|---|---|---|---|
| 5,340,676 | A | 8/1994 | Anderson et al. | |
| 5,368,995 | A | 11/1994 | Christian et al. | |
| 5,457,013 | A | 10/1995 | Christian et al. | |
| 5,731,119 | A | 3/1998 | Eichorst et al. | |
| 6,355,405 | B1 | 3/2002 | Ludemann et al. | |
| 6,464,413 | B2 | 10/2002 | Oyamada | |
| 6,641,989 | B2 | 11/2003 | Sasaki et al. | |
| 6,689,546 | B1 | 2/2004 | LaBelle et al. | |
| 2006/0046215 | A1 * | 3/2006 | Ludemann et al. | 430/619 |

FOREIGN PATENT DOCUMENTS

| | | |
|---|---|---|
| EP | 1 057 621 | 12/2000 |

OTHER PUBLICATIONS

U.S. Appl. No. 10/930,428, filed Aug. 31, 2004 titled *Thermally Developable Materials With Backside Conductive Layer* by T.J. Ludemann et al.

U.S. Appl. No. 10/930,438, filed Aug. 31, 2004 titled *Improved Antistatic Properties For Thermally Developable Materials* by T.J. Ludemann et al.

"Preparation of Electrically Conductive and Transparent Film on CRT Panel" (paper #495) by Young-Sang Cho et al.

*The Structure Formation of Nanoparticles During Coating and Drying* by Y. Yamaguchi et al, 12th Intern'l Coating Sci. and Tech. Sym., Rochester, NY Sep. 19-22, 2004, pp. 186-189.

* cited by examiner

*Primary Examiner*—Richard L. Schilling
(74) *Attorney, Agent, or Firm*—J. Lanny Tucker; Louis M. Leichter

(57) ABSTRACT

Backside conductive layers with increased conductive efficiency can be provided for thermally developable materials by formulating hydrophilic metal oxide clusters in a hydrophobic environment using low shear mixing conditions. The dry thickness and coating weight of the conductive layer are thereby reduced.

9 Claims, No Drawings

THERMALLY DEVELOPABLE MATERIALS WITH IMPROVED CONDUCTIVE LAYER

CROSS-REFERENCE TO RELATED APPLICATION

This is a Divisional of application Ser. No. 10/978,205, filed Oct. 29, 2004, now U.S. Pat. No. 7,067,242.

FIELD OF THE INVENTION

This invention relates to thermally developable materials having certain backside conductive layers. In particular, this invention relates to thermographic and photothermographic materials having "buried" backside conductive layers with improved "conductive efficiency." This invention also relates to methods of imaging using these thermally developable materials.

BACKGROUND OF THE INVENTION

Silver-containing thermographic and photothermographic imaging materials (that is, thermally developable imaging materials) that are imaged and/or developed using heat and without liquid processing have been known in the art for many years.

Silver-containing thermographic imaging materials are non-photosensitive materials that are used in a recording process wherein images are generated by the use of thermal energy. These materials generally comprise a support having disposed thereon (a) a relatively or completely non-photosensitive source of reducible silver ions, (b) a reducing composition (usually including a developer) for the reducible silver ions, and (c) a suitable hydrophilic or hydrophobic binder.

In a typical thermographic construction, the image-forming layers are based on silver salts of long chain fatty acids. Typically, the preferred non-photosensitive reducible silver source is a silver salt of a long chain aliphatic carboxylic acid having from 10 to 30 carbon atoms. The silver salt of behenic acid or mixtures of acids of similar molecular weight are generally used. At elevated temperatures, the silver of the silver carboxylate is reduced by a reducing agent for silver ion such as methyl gallate, hydroquinone, substituted-hydroquinones, hindered phenols, catechols, pyrogallol, ascorbic acid, and ascorbic acid derivatives, whereby an image of elemental silver is formed. Some thermographic constructions are imaged by contacting them with the thermal head of a thermographic recording apparatus such as a thermal printer or thermal facsimile. In such constructions, an anti-stick layer is coated on top of the imaging layer to prevent sticking of the thermographic construction to the thermal head of the apparatus utilized. The resulting thermographic construction is then heated to an elevated temperature, typically in the range of from about 60 to about 225° C., resulting in the formation of an image.

Silver-containing photothermographic imaging materials (that is, photosensitive thermally developable imaging materials) that are imaged with actinic radiation and then developed using heat and without liquid processing have been known in the art for many years. Such materials are used in a recording process wherein an image is formed by imagewise exposure of the photothermographic material to specific electromagnetic radiation (for example, X-radiation, or ultraviolet, visible, or infrared radiation) and developed by the use of thermal energy. These materials, also known as "dry silver" materials, generally comprise a support having coated thereon: (a) a photocatalyst (that is, a photosensitive compound such as silver halide) that upon such exposure provides a latent image in exposed grains that are capable of acting as a catalyst for the subsequent formation of a silver image in a development step, (b) a relatively or completely non-photosensitive source of reducible silver ions, (c) a reducing composition (usually including a developer) for the reducible silver ions, and (d) a hydrophilic or hydrophobic binder. The latent image is then developed by application of thermal energy.

In photothermographic materials, exposure of the photographic silver halide to light produces small clusters containing silver atoms $(Ag^0)_n$. The imagewise distribution of these clusters, known in the art as a latent image, is generally not visible by ordinary means. Thus, the photosensitive material must be further developed to produce a visible image. This is accomplished by the reduction of silver ions that are in catalytic proximity to silver halide grains bearing the silver-containing clusters of the latent image. This produces a black-and-white image. The non-photosensitive silver source is catalytically reduced to form the visible black-and-white negative image while much of the silver halide, generally, remains as silver halide and is not reduced.

In photothermographic materials, the reducing agent for the reducible silver ions, often referred to as a "developer," may be any compound that, in the presence of the latent image, can reduce silver ion to metallic silver and is preferably of relatively low activity until it is heated to a temperature sufficient to cause the reaction. A wide variety of classes of compounds have been disclosed in the literature that function as developers for photothermographic materials. At elevated temperatures, the reducible silver ions are reduced by the reducing agent. This reaction occurs preferentially in the regions surrounding the latent image. This reaction produces a negative image of metallic silver having a color that ranges from yellow to deep black depending upon the presence of toning agents and other components in the photothermographic imaging layer(s).

Differences Between Photothermography and Photography

The imaging arts have long recognized that the field of photo-thermography is clearly distinct from that of photography. Photothermographic materials differ significantly from conventional silver halide photographic materials that require processing with aqueous processing solutions.

In photothermographic imaging materials, a visible image is created by heat as a result of the reaction of a developer incorporated within the material. Heating at 50° C. or more is essential for this dry development. In contrast, conventional photographic imaging materials require processing in aqueous processing baths at more moderate temperatures (from 30° C. to 50° C.) to provide a visible image.

In photothermographic materials, only a small amount of silver halide is used to capture light and a non-photosensitive source of reducible silver ions (for example, a silver carboxylate or a silver benzotriazole) is used to generate the visible image using thermal development. Thus, the imaged photosensitive silver halide serves as a catalyst for the physical development process involving the non-photosensitive source of reducible silver ions and the incorporated reducing agent. In contrast, conventional wet-processed, black-and-white photographic materials use only one form of silver (that is, silver halide) that, upon chemical development, is itself at least partially converted into the silver image, or that upon physical development requires addition of an external silver source (or other reducible metal ions that form black images upon reduction to the corresponding metal). Thus, photothermographic materials require an amount of silver halide per unit area that is only a fraction of that used in conventional wet-processed photographic materials.

In photothermographic materials, all of the "chemistry" for imaging is incorporated within the material itself. For example, such materials include a developer (that is, a reducing agent for the reducible silver ions) while conventional photographic materials usually do not. The incorporation of the developer into photothermographic materials can lead to increased formation of various types of "fog" or other undesirable sensitometric side effects. Therefore, much effort has gone into the preparation and manufacture of photothermographic materials to minimize these problems.

Moreover, in photothermographic materials, the unexposed silver halide generally remains intact after development and the material must be stabilized against further imaging and development. In contrast, silver halide is removed from conventional photographic materials after solution development to prevent further imaging (that is in the aqueous fixing step).

Because photothermographic materials require dry thermal processing, they present distinctly different problems and require different materials in manufacture and use, compared to conventional, wet-processed silver halide photographic materials. Additives that have one effect in conventional silver halide photographic materials may behave quite differently when incorporated in photothermographic materials where the underlying chemistry is significantly more complex. The incorporation of such additives as, for example, stabilizers, antifoggants, speed enhancers, supersensitizers, and spectral and chemical sensitizers in conventional photographic materials is not predictive of whether such additives will prove beneficial or detrimental in photothermographic materials. For example, it is not uncommon for a photographic antifoggant useful in conventional photographic materials to cause various types of fog when incorporated into photothermographic materials, or for supersensitizers that are effective in photographic materials to be inactive in photothermographic materials.

These and other distinctions between photothermographic and photographic materials are described in *Unconventional Imaging Processes*, E. Brinckman et al. (Eds.), The Focal Press, London and New York, 1978, pp. 74–75, in D. H. Klosterboer, *Imaging Processes and Materials*, (*Neblette's Eighth Edition*), J. Sturge, V. Walworth, and A. Shepp, Eds., Van Nostrand-Reinhold, New York, 1989, Chapter 9, pp. 279–291, in Zou et al., *J. Imaging Sci. Technol.* 1996, 40, pp. 94–103, and in M. R. V. Sahyun, *J. Imaging Sci. Technol.* 1998, 42, 23.

Problem to be Solved

Many of the chemicals used to make supports or supported layers in thermally developable materials have electrically insulating properties, and electrostatic charges frequently build up on the materials during manufacture, packaging, and use. The accumulated charges can cause various problems. For example, in photothermographic materials containing photosensitive silver halides, accumulated electrostatic charge can generate light to which the silver halides are sensitive. This may result in imaging defects that are a particular problem where the images are used for medical diagnosis.

Build-up of electrostatic charge can also cause sheets of thermally processable materials to stick together causing misfeeds and jamming within processing equipment. Additionally, accumulated electrostatic charge can attract dust or other particulate matter to the materials, thereby requiring more cleaning to insure rapid transport through the processing equipment and quality imaging.

Build-up of electrostatic charge also makes handling of developed sheets of imaged material more difficult. For example, radiologists desire a static free sheet for viewing on light boxes. This problem can be particularly severe when reviewing an imaged film that has been stored for a long period of time because many antistatic materials loose their effectiveness over time.

In general, electrostatic charge is related to surface resistivity (measured in ohm/sq) and charge level. While electrostatic charge control agents (or antistatic agents) can be included in any layer of an imaging material, the accumulation of electrostatic charge can be prevented by reducing the surface resistivity or by lowering the charge level. These results can usually be achieved by including charge control agents in surface layers such as protective overcoats. In thermally processable materials, charge control agents may be used in backing layers that are on the opposite side of the support as the imaging layers. Another approach taken to reduce surface resistivity is to include a "buried" conductive layer incorporating conductive particles.

A wide variety of charge control agents, both inorganic and organic, have been devised and used for electrostatic charge control and numerous publications describe such agents. Metal oxides are described in conductive layers in U.S. Pat. No. 5,340,676 (Anderson et al.), U.S. Pat. No. 6,464,413 (Oyamada), U.S. Pat. No. 5,368,995 (Christian et al.), and U.S. Pat. No. 5,457,013 (Christian et al.).

U.S. Pat. No. 5,731,119 (Eichorst et al.) describes the use of acicular metal oxides in aqueous-coated conductive layers for use in antistatic compositions. An aqueous-coated sample containing granular zinc antimonate served as a comparison.

U.S. Pat. No. 6,355,405 (Ludemann et al.) describes thermally developable materials that include very thin adhesion-promoting layers on either side of the support. These adhesion-promoting layers include specific mixtures of polymers and other compounds to promote adhesion, and are also known as "carrier" layers.

U.S. Pat. No. 6,689,546 (LaBelle et al.) describes thermally developable materials that contain a backside conductive layer comprising non-acicular metal antimonate nanoparticles in the amount of from about 40 to about 55% (based on total dry weight). These nanoparticles are approximately 20 nm in size. It is believed that upon coating and drying, a physical network of nanoparticles is formed to provide a conductive pathway to remove electrostatic charge.

Conductive layers with a high metal antimonate to binder ratio useful for thermally developable materials are described in copending and commonly assigned U.S. Ser. No. 10/930,428 (filed Aug. 31, 2004 by Ludemann, LaBelle, Koestner, Hefley, Bhave, Geisler, and Philip). Conductivity is provided by non-acicular metal antimonate nanoparticles that are present in an amount greater than 55 and up to 85 dry weight % at a coverage of from about 0.06 to about 0.5 $g/m^2$, and the ratio of total binder polymers in the backside conductive layer to the non-acicular metal antimonate nanoparticles is less than 0.75:1 (based on total dry weight).

Buried backside conductive layers comprising non-acicular metal antimonate nanoparticles in one or more binder polymers, and a non-imaging backside overcoat layer are described in copending and commonly assigned U.S. Ser.

No. 10/930,438 (filed Aug. 31, 2004 by Ludemann, LaBelle, Philip, Koestener, and Bhave).

U.S. Pat. No. 6,641,989 (Sasaki et al.) describes photothermographic materials wherein at least one side of the support is provided with a sublayer containing a metal oxide in an amount of 5 to 50% by volume and the surface of the sublayer exhibits a maximum height (Ry) [surface roughness] of not more than 0.1 μm.

The clustering of nanoparticles upon coating and drying to form non-isotropic structures such as chains or trees is described in, Y. Yamaguchi, H. Sasakura, T. Ookubo, and M. Fujita, *The Structure Formation of Nanoparticles During Coating and Drying,* $12^{th}$ International Coating Science and Technology Symposium, Rochester, N.Y., Sep. 19–22, 2004, pp. 186–189.

Despite these advances, little attention has been paid to the effect of large-scale processing conditions on the "conductive efficiency" of the formulations described above. For example, when production quantities of backside conductive materials are prepared, the speed required for efficient mixing often results in shear conditions that are different from those involved for the preparation of laboratory quantities. As a result, the conductive backside materials so produced can have properties different from those of laboratory-prepared samples. Often these different properties result in materials having poorer conductive efficiency.

There is, therefore, a continuing need in the industry to find more efficient and less costly ways to reduce electrostatic charge, particularly in "buried" layers on the backside of thermally developable imaging materials. There is also a need for materials with improved conductive efficiency, so that the same performance can be achieved using less conductive material with lower coating weights, and thinner coatings of the conductive layer. There is a further need to prepare these materials by simultaneously coating multiple layers.

SUMMARY OF THE INVENTION

The present invention provides a thermally developable material that comprises a support having on one side thereof, one or more thermally developable imaging layers comprising a binder and in reactive association, a non-photosensitive source of reducible silver ions, and a reducing agent composition for the non-photosensitive source reducible silver ions, and having disposed on the backside of the support a non-imaging backside conductive layer comprising a conductive metal oxide in a one or more binder polymers, and a first layer disposed over the non-imaging backside conductive layer, wherein:

1) the backside conductive layer has a water electrode resistivity measured at 21.1° C. and 50% relative humidity of $1\times10^{12}$ ohms/sq or less,
2) the total amount of the one or more binder polymers in the backside conductive layer is at least 35 weight %,
3) the conductive metal oxide is present in an amount of less than 2 $g/m^2$,
4) the backside conductive layer has a normalized average gap density of at least 0.03 $(gaps/\mu m^3)/(mg/ft^2)$, the gaps being at least 0.25 μm between conductive particles or clusters, and
5) the backside conductive layer has a normalized average metal oxide cluster size distribution of at least 0.012 $(\mu m)/(mg/ft^2)$.

Alternatively, the present invention provides a thermally developable material that comprises a support having on one side thereof, one or more thermally developable imaging layers comprising a binder and in reactive association, a non-photosensitive source of reducible silver ions, and a reducing agent composition for the non-photosensitive source reducible silver ions, and having disposed on the backside of the support a non-imaging backside conductive layer comprising a conductive metal oxide in a one or more binder polymers, and a first layer disposed over the non-imaging backside conductive layer, wherein:

1) the backside conductive layer has a water electrode resistivity measured at 21.1° C. and 50% relative humidity of $1\times10^{12}$ ohms/sq or less,
2) the one or more binder polymers in the backside conductive layer is at least 35 weight %,
3) the backside conductive layer has a normalized average gap density of at least 0.03 $(gaps/\mu m^3)/(mg/ft^2)$, the gaps being at least 0.25 μm between conductive particles or clusters, and
4) the backside conductive layer has a normalized average metal oxide cluster size distribution of at least 0.012 $(\mu m)/(mg/ft^2)$.

This invention also provides a photothermographic material that comprises a support having on one side thereof, one or more thermally developable imaging layers comprising a binder and in reactive association, a photosensitive silver halide, a non-photosensitive source of reducible silver ions, and a reducing agent composition for the non-photosensitive source reducible silver ions, and having disposed on the backside of the support, a simultaneously coated first layer and a non-imaging backside conductive layer:

a) the first layer comprising a film-forming polymer, and b) interposed between the support and the first layer and directly adhering the first layer to said support, the non-imaging backside conductive layer comprising non-acicular metal antimonate in a mixture of two or more polymers that include a first polymer serving to promote adhesion of the backside conductive layer directly to the support, and a second polymer that is different than and forms a single phase mixture with the first polymer, wherein:

1) the backside conductive layer has a water electrode resistivity measured at 21.1° C. and 50% relative humidity of $1\times10^{12}$ ohms/sq or less,
2) the total amount of mixture of two or more polymers in the backside conductive layer is at least 35 weight %,
3) the non-acicular metal antimonate is present in an amount of less than 2 $g/m^2$,
4) the film-forming polymer of the first layer and the second polymer of the backside conductive layer are the same or different polyvinyl acetal resins, polyester resins, cellulosic polymers, maleic anhydride-ester copolymers, or vinyl polymers,
5) the backside conductive layer has a normalized average gap density of at least 0.03 $(gaps/\mu m^3)/(mg/ft^2)$, the gaps being at least 0.25 μm between conductive particles or clusters, and
6) the backside conductive layer has a normalized average metal oxide cluster size distribution of at least 0.012 $(\mu m)/(mg/ft^2)$.

In preferred embodiments, a black-and-white photothermographic material comprises a transparent polymeric support having on one side thereof one or more thermally developable imaging layers comprising predominantly one or more hydrophobic binders, and in reactive association, preformed photosensitive silver bromide or silver iodobromide present as tabular and/or cubic grains, a non-photosensitive source of reducible silver ions that includes silver behenate, a reducing agent composition for the non-photosensitive source reducible silver ions comprising a hindered phenol, and a protective layer disposed over the one or more thermally developable imaging layers, and having disposed on the backside of the support, a simultaneously coated backside protective layer and a non-imaging backside conductive layer:

a) the backside protective layer comprising a film-forming polymer that is cellulose acetate butyrate and an antihalation composition, and b) interposed between the support and the backside protective layer and directly adhering the backside protective layer to the support, the non-imaging backside conductive layer comprising non-acicular metal antimonate clusters in a mixture of two or more polymers that include a first polymer serving to promote adhesion of the conductive layer directly to the support, and a second polymer that is different than and forms a single phase mixture with the first polymer, wherein the first polymer of the backside conductive layer is a polyester and the second polymer of the backside conductive layer is cellulose acetate butyrate, wherein the non-acicular metal antimonate clusters are composed of zinc antimonate ($ZnSb_2O_6$) that is present at a coverage of from about 0.2 to about 0.6 g/m$^2$, the dry thickness of the backside conductive layer is from about 0.20 to about 0.8 μm, the weight % of the polymer mixture in the backside conductive layer is from about 45 to about 55 weight %, and the backside conductive layer has a water electrode resistivity measured at 21.1° C. and 50% relative humidity of less than about $1\times10^{11}$ ohms/sq, a normalized average gap density of at least 0.03 (gaps/μm$^3$)/(mg/ft$^2$), the gaps being at least 0.25 μm between conductive particles or clusters, and a normalized average metal oxide cluster size distribution of at least 0.012 (μm)/(mg/ft$^2$).

This invention also provides a method of forming a visible image comprising:

(A) imagewise exposing a photothermographic material of this invention to electromagnetic radiation to form a latent image, (B) simultaneously or sequentially, heating the exposed photothermographic material to develop the latent image into a visible image.

In alternative methods of this invention, a method of forming a visible image comprises:

(A') thermal imaging of the thermally developable material of this invention that is a thermographic material.

The present invention also provides a method of preparing a thermally developable material that comprises a support having on one side thereof, one or more thermally developable imaging layers comprising a binder and in reactive association, a non-photosensitive source of reducible silver ions, and a reducing agent composition for the non-photosensitive source reducible silver ions, comprising:

simultaneously coating on the backside of the support both a non-imaging backside conductive formulation comprising a conductive metal oxide in one or more binder polymers, and a first layer formulation, out of the same or different organic solvents, to provide first layer over a non-imaging backside conductive layer, 1) the backside conductive layer, when dried, having a water electrode resistivity measured at 21.1° C. and 50% relative humidity of $1\times10^{12}$ ohms/sq or less, 2) the total dry amount of the one or more binder polymers in the backside conductive layer is at least 35 weight %, 3) the conductive metal oxide is present in an amount of less than 2 g/m$^2$.

In another embodiment, a method of making a stable dispersion of a conductive hydrophilic metal oxide comprises:

A) adding a dispersion of nanoparticles of a conductive hydrophilic metal oxide in a first solvent to a mixing vessel, B) adding a second, hydrophobic, solvent to the mixing vessel with sufficient agitation to maintain the metal oxide nanoparticles in dispersion or in clusters having an average size of less than 1 μm, and C) adding a binder premix comprising a binder in the second solvent to said mixing vessel with a shear rate sufficient to allow growth of clusters of the metal oxide nanoparticles to an average size of 1 μm or less to form a stable dispersion of the metal oxide clusters, wherein steps B and C can be carried out sequentially or simultaneously after step A.

In preferred embodiments, a method of making a stable dispersion of a conductive hydrophilic metal oxide comprises:

A) adding a dispersion of nanoparticles of zinc antimonate ($ZnSb_2O_6$) in an alcoholic solvent to a mixing vessel, B) adding methyl ethyl ketone to the mixing vessel with sufficient agitation to maintain the zinc antimonate nanoparticles in dispersion or in clusters having an average particle size of from about 50 nm, to about 1 μm, and C) adding a binder premix comprising a single phase mixture of a polyester resin with either polyvinyl butyral or cellulose acetate butyrate, in methyl ethyl ketone to the mixing vessel with a shear rate having a Reynolds number ($N_{RE}$) of less than from about 20,000 to about 23,000 to allow growth of clusters of the zinc antimonate nanoparticles to an average size of from about 50 nm to about 1 μm or less to form a stable dispersion of the zinc antimonate clusters, wherein steps B and C are carried out sequentially after step A.

These image-forming methods are particularly useful for providing a medical diagnosis of a human or animal subject.

The present invention provides a means for providing exceptional conductivity of a buried backside metal oxide conductive layer using less conductive metal oxide. This has been done by using formulations where the metal oxides are present as "clusters" having certain controlled sizes that are obtained by controlling the shear conditions under which the conductive layer formulations are prepared. An additional benefit of a thin backside overcoat layer and a thin buried backside conductive layer is lower manufacturing cost. While it is contemplated that any conductive metal oxide can be used in the practice of this invention, the advantages are best seen with the preparation and use of buried zinc antimonate conductive layers.

DETAILED DESCRIPTION OF THE INVENTION

The thermally developable materials described herein are both thermographic and photothermographic materials. While the following discussion will often be directed primarily to the preferred photothermographic embodiments, it would be readily understood by one skilled in the art that thermographic materials can be similarly constructed and used to provide black-and-white or color images using appropriate imaging chemistry and particularly non-photosensitive organic silver salts, reducing agents, toners, binders, and other components known to a skilled artisan. In both thermographic and photothermographic materials, the metal oxide clusters described herein are incorporated into a separate buried conductive ("antistatic") layer on at least the backside and optionally on both sides of the support.

The thermally developable materials of this invention can be used in black-and-white or color thermography and photothermography and in electronically generated black-and-white or color hardcopy recording. They can be used in microfilm applications, in radiographic imaging (for example digital medical imaging), X-ray radiography, and in industrial radiography. Furthermore, the absorbance of these photothermographic materials between 350 and 450 nm is desirably low (less than 0.5), to permit their use in the graphic arts area (for example, imagesetting and phototypesetting), in the manufacture of printing plates, in contact printing, in duplicating ("duping"), and in proofing.

The thermally developable materials are particularly useful for imaging of human or animal subjects in response to visible, X-radiation, or infrared radiation for use in a medical diagnosis. Such applications include, but are not limited to, thoracic imaging, mammography, dental imaging, orthopedic imaging, general medical radiography, therapeutic radiography, veterinary radiography, and autoradiography. When used with X-radiation, the photothermographic materials may be used in combination with one or more phosphor intensifying screens, with phosphors incorporated within the photothermographic emulsion, or with combinations thereof. Such materials are particularly useful for dental radiography when they are directly imaged by X-radiation. The materials are also useful for non-medical uses of X-radiation such as X-ray lithography and industrial radiography.

The photothermographic materials can be made sensitive to radiation of any suitable wavelength. Thus, in some embodiments, the materials are sensitive at ultraviolet, visible, infrared, or near infrared wavelengths, of the electromagnetic spectrum. In preferred embodiments, the materials are sensitive to radiation greater than 700 nm (and generally up to 1150 nm). Increased sensitivity to a particular region of the spectrum is imparted through the use of various spectral sensitizing dyes.

In the photothermographic materials, the components needed for imaging can be in one or more photothermographic imaging, layers on one side ("frontside") of the support. The layer(s) that contain the photosensitive photocatalyst (such as a photosensitive silver halide) or non-photosensitive source of reducible silver ions, or both, are referred to herein as photothermographic emulsion layer(s). The photocatalyst and the non-photosensitive source of reducible silver ions are in catalytic proximity and preferably are in the same emulsion layer.

Similarly, in the thermographic materials of this invention, the components needed for imaging can be in one or more layers. The layer(s) that contain the non-photosensitive source of reducible silver ions are referred to herein as thermographic emulsion layer(s).

Where the materials contain imaging layers on one side of the support only, various non-imaging layers are usually disposed on the "backside" (non-emulsion or non-imaging side) of the materials, including at least one buried conductive layer described herein, and optionally antihalation layer(s), protective layers, and transport enabling layers.

Various non-imaging layers can also be disposed on the "frontside" or imaging or emulsion side of the support, including protective topcoat layers, primer layers, interlayers, opacifying layers, antistatic layers, antihalation layers, acutance layers, auxiliary layers, and other layers readily apparent to one skilled in the art.

For some embodiments, it may be useful that the thermally developable materials be "double-sided" or "duplitized" and have the same or different thermally developable coatings (or imaging layers) on both sides of the support. In such constructions each side can also include one or more protective topcoat layers, primer layers, interlayers, acutance layers, auxiliary layers, anti-crossover layers, and other layers readily apparent to one skilled in the art, as well as the required conductive layer(s).

When the thermally developable materials are heat-developed as described below in a substantially water-free condition after, or simultaneously with, imagewise exposure, a silver image (preferably a black-and-white silver image) is obtained.

Definitions

As used herein:

In the descriptions of the thermally developable materials, "a" or "an" component refers to "at least one" of that component (for example, the specific conductive metal oxide described herein).

Unless otherwise indicated, when the terms "thermally developable materials," "photothermographic materials," and "thermographic materials" are used herein, the terms refer to materials of the present invention.

Heating in a substantially water-free condition as used herein, means heating at a temperature of from about 50° C. to about 250° C. with little more than ambient water vapor present. The term "substantially water-free condition" means that the reaction system is approximately in equilibrium with water in the air and water for inducing or promoting the reaction is not particularly or positively supplied from the exterior to the material. Such a condition is described in T. H. James, *The Theory of the Photographic Process*, Fourth Edition, Eastman Kodak Company, Rochester, N.Y., 1977, p. 374.

"Photothermographic material(s)" means a construction comprising a support and at least one photothermographic emulsion layer or a photothermographic set of emulsion layers, wherein the photosensitive silver halide and the source of reducible silver ions are in one layer and the other necessary components or additives are distributed, as desired, in the same layer or in an adjacent coated layer. These materials also include multilayer constructions in which one or more imaging components are in different layers, but are in "reactive association." For example, one layer can include the non-photosensitive source of reducible silver ions and another layer can include the reducing composition, but the two reactive components are in reactive association with each other.

"Thermographic materials" are similarly defined except that no photosensitive silver halide catalyst is purposely added or created.

When used in photothermography, the term, "imagewise exposing" or "imagewise exposure" means that the material is imaged using any exposure means that provides a latent image using electromagnetic radiation. This includes, for example, by analog exposure where an image is formed by projection onto the photosensitive material as well as by digital exposure where the image is formed one pixel at a time such as by modulation of scanning laser radiation.

When used in thermography, the term, "imagewise exposing" or "imagewise exposure" means that the material is imaged using any means that provides an image using heat. This includes, for example, by analog exposure where an image is formed by differential contact heating through a mask using a thermal blanket or infrared heat source, as well as by digital exposure where the image is formed one pixel at a time such as by modulation of thermal print-heads or by thermal heating using scanning laser radiation.

"Catalytic proximity" or "reactive association" means that the reactive components are in the same layer or in adjacent layers so that they readily come into contact with each other during imaging and thermal development.

"Emulsion layer," "imaging layer," "thermographic emulsion layer," or "photothermographic emulsion layer" means a layer of a thermographic or photothermographic material that contains the photosensitive silver halide (when used) and/or non-photosensitive source of reducible silver ions, or a reducing composition. Such layers can also contain additional components or desirable additives. These layers are usually on what is known as the "frontside" of the support, but they can also be on both sides of the support.

"Photocatalyst" means a photosensitive compound such as silver halide that, upon exposure to radiation, provides a compound that is capable of acting as a catalyst for the subsequent development of the image-forming material.

"Simultaneous coating" or "wet-on-wet" coating means that when multiple layers are coated, subsequent layers are coated onto the initially coated layer before the initially coated layer is dry.

Many of the chemical components used herein are provided as a solution. The term "active ingredient" means the amount or the percentage of the desired chemical component contained in a sample. All amounts listed herein are the amount of active ingredient added unless otherwise specified.

"Ultraviolet region of the spectrum" refers to that region of the spectrum less than or equal to 410 nm (preferably from about 100 nm to about 410 nm) although parts of these ranges may be visible to the naked human eye.

"Visible region of the spectrum" refers to that region of the spectrum of from about 400 nm to about 700 nm.

"Short wavelength visible region of the spectrum" refers to that region of the spectrum of from about 400 nm to about 450 nm.

"Red region of the spectrum" refers to that region of the spectrum of from about 600 nm to about 700 nm.

"Infrared region of the spectrum" refers to that region of the spectrum of from about 700 nm to about 1400 nm.

"Non-photosensitive" means not intentionally light sensitive.

The sensitometric terms "photospeed," "speed," or "photographic speed" (also known as sensitivity), absorbance, and contrast have conventional definitions known in the imaging arts.

In photothermographic materials, the term $D_{min}$ (lower case) is considered herein as image density achieved when the photothermographic material is thermally developed without prior exposure to radiation. The term $D_{max}$ (lower case) is the maximum image density achieved in the imaged area of a particular sample after imaging and development. In thermographic materials, $D_{min}$ is considered herein as the image density in the areas with the minimum application of heat by the thermal print-head. In thermographic materials, the term $D_{max}$ is the maximum image density achieved when the thermographic material is thermally imaged with a given amount of thermal energy.

In both photothermographic and thermographic materials, the term $D_{MIN}$ (upper case) is the density of the non-imaged material. In photothermographic materials, the term $D_{MAX}$ (upper case) is the maximum image density achievable when the photothermographic material is exposed and then thermally developed. In thermographic materials, the term $D_{MAX}$ is the maximum image density achievable when the thermographic material is thermally developed. $D_{MAX}$ is also known as "Saturation Density."

The sensitometric term absorbance is another term for optical density (OD).

"Transparent" means capable of transmitting visible light or imaging radiation without appreciable scattering or absorption.

As used herein, the phrase "silver organic coordinating ligand" refers to an organic molecule capable of forming a bond with a silver atom. Although the compounds so formed are technically silver coordination compounds they are also often referred to as silver salts.

The term "buried layer" means that there is at least one other layer disposed over the layer (such as a "buried" backside conductive layer).

The terms "coating weight," "coat weight," and "coverage" are synonymous, and are usually expressed in weight per unit area such as $g/m^2$.

"Conductive efficiency" refers to the amount of conductive particles necessary to achieve a given conductivity. Samples with a high conductive efficiency require fewer conductive particles to achieve a given conductivity than those of a comparative sample. Alternatively, conductive efficiency can also refer to samples having a higher conductivity with the same number of particles (that is, the same coating weight).

"Average Cluster Size Distribution" is a measure of the amount of clustering of the metal oxide in the buried backside conductive layer.

"Average Gap Density" is a measure of the distance between conductive species (particles or clusters).

As is well understood in this art, for the chemical compounds herein described, substitution is not only tolerated, but is often advisable and various substituents are anticipated on the compounds used in the present invention unless otherwise stated. Thus, when a compound is referred to as "having the structure" of a given formula, any substitution that does not alter the bond structure of the formula or the shown atoms within that structure is included within the formula, unless such substitution is specifically excluded by language.

As a means of simplifying the discussion and recitation of certain substituent groups, the term "group" refers to chemical species that may be substituted as well as those that are not so substituted. Thus, the term "alkyl group" is intended to include not only pure hydrocarbon alkyl chains, such as methyl, ethyl, n-propyl, t-butyl, cyclohexyl, iso-octyl, and octadecyl, but also alkyl chains bearing substituents known in the art, such as hydroxyl, alkoxy, phenyl, halogen atoms. (F, Cl, Br, and I), cyano, nitro, amino, and carboxy. For example, alkyl group includes ether and thioether groups (for example $CH_3—CH_2—CH_2—O—CH_2—$ and $CH_3—CH_2—CH_2—S—CH_2—$), haloalkyl, nitroalkyl, alkylcarboxy, carboxyalkyl, carboxamido, hydroxyalkyl, sulfoalkyl, and other groups readily apparent to one skilled in the art. Substituents that adversely react with other active ingredients, such as very strongly electrophilic or oxidizing substituents, would, of course, be excluded by the skilled artisan as not being inert or harmless.

*Research Disclosure* is a publication of Kenneth Mason Publications Ltd., Dudley House, 12 North Street, Emsworth, Hampshire PO10 7DQ England. It is also available from Emsworth Design Inc., 147 West 24th Street, New York, N.Y. 10011.

Other aspects, advantages, and benefits of the present invention are apparent from the detailed description, examples, and claims provided in this application.

The Photocatalyst

As noted above, photothermographic materials include one or more photocatalysts in the photothermographic emulsion layer(s). Useful photo-catalysts are typically photosensitive silver halides such as silver bromide, silver iodide, silver chloride, silver bromoiodide, silver chlorobromoiodide, silver chlorobromide, and others readily apparent to one skilled in the art. Mixtures of silver halides can also be used in any:suitable proportion. Silver bromide and silver bromoiodide are more preferred, with the latter silver halide generally having up to 10 mol % silver iodide.

In some embodiments of aqueous-based photothermographic materials, higher amounts of iodide may be present in homogeneous photosensitive silver halide grains, and particularly from about 20 mol % up to the saturation limit of iodide as described, for example, U.S. Patent Application Publication 2004/0053173 (Maskasky et al.).

The silver halide grains may have any crystalline habit or morphology including, but not limited to, cubic, octahedral, tetrahedral, orthorhombic, rhombic, dodecahedral, other polyhedral, tabular, laminar, twinned, or platelet morphologies and may have epitaxial growth of crystals thereon. If desired, a mixture of grains with different morphologies can be employed. Silver halide grains having cubic and tabular morphology (or both) are preferred.

The silver halide grains may have a uniform ratio of halide throughout. They may also have a graded halide content, with a continuously varying ratio of, for example, silver bromide and silver iodide or they may be of the core-shell type, having a discrete core of one or more silver halides, and a discrete shell of one or more different silver halides. Core-shell silver halide grains useful in photothermographic materials and methods of preparing these materials are described in U.S. Pat. No. 5,382,504 (Shor et al.), incorporated herein by reference. Iridium and/or copper doped core-shell and non-core-shell grains are described in U.S. Pat. No. 5,434,043 (Zou et al.) and U.S. Pat. No. 5,939,249 (Zou), both incorporated herein by reference.

In some instances, it may be helpful to prepare the photosensitive silver halide grains in the presence of a hydroxytetrazaindene (such as 4-hydroxy-6-methyl-1,3,3a,7-tetrazaindene) or an N-heterocyclic compound comprising at least one mercapto group (such as 1-phenyl-5-mercaptotetrazole) as described in U.S. Pat. No. 6,413,710 (Shor et al.) that is incorporated herein by reference.

The photosensitive silver halide can be added to (or formed within) the emulsion layer(s) in any fashion as long as it is placed in catalytic proximity to the non-photosensitive source of reducible silver ions.

It is preferred that the silver halides be preformed and prepared by an ex-situ process. With this technique, one has the possibility of more precisely controlling the grain size, grain size distribution, dopant levels, and composition of the silver halide, so that one can impart more specific properties to both the silver halide grains and the resulting photothermographic material.

In some constructions, it is preferable to form the non-photosensitive source of reducible silver ions in the presence of ex-situ-prepared silver halide. In this process, the source of reducible silver ions, such as a long chain fatty acid silver carboxylate (commonly referred to as a silver "soap"), is formed in the presence of the preformed silver halide grains. Co-precipitation of the source of reducible silver ions in the presence of silver halide provides a more intimate mixture of the two materials [see U.S. Pat. No. 3,839,049 (Simons)] to provide a material often referred to as a "preformed soap."

In some constructions, it is preferred that preformed silver halide grains be added to and "physically mixed" with the non-photosensitive source of reducible silver ions.

Preformed silver halide emulsions can be prepared by aqueous or organic processes and can be unwashed or washed to remove soluble salts. Soluble salts can be removed by any desired procedure for example as described in U.S. Pat. No. 2,618,556 (Hewitson et al.), U.S. Pat. No. 2,614,928 (Yutzy et al.), U.S. Pat. No. 2,565,418 (Yackel), U.S. Pat. No. 3,241,969 (Hart et al.), and; U.S. Pat. No. 2,489,341 (Waller et al.).

It is also effective to use an in-situ process in which a halide- or a halogen-containing compound is added to an organic silver salt to partially convert the silver of the organic silver salt to silver halide. Inorganic halides (such as zinc bromide, zinc iodide, calcium bromide, lithium bromide, lithium iodide, or mixtures thereof) or an organic halogen-containing compound (such as N-bromosuccinimide or pyridinium hydrobromide perbromide) can be used. The details of such in-situ generation of silver halide are well known and described in U.S. Pat. No. 3,457,075 (Morgan et al.).

It is particularly effective to use a mixture of both preformed and in-situ generated silver halide. The preformed silver halide is preferably present in a preformed soap.

Additional methods of preparing silver halides and organic silver salts and blending them are described in *Research Disclosure*, June 1978, item 17029, U.S. Pat. No. 3,700,458 (Lindholm) and U.S. Pat. No. 4,076,539 (Ikenoue et al.), and Japanese Kokai 49-013224 (Fuji), 50-017216 (Fuji), and 51-042529 (Fuji).

The silver halide grains used in the imaging formulations can vary in average diameter of up to several micrometers (μm) depending on the desired use. Preferred silver halide grains for use in preformed emulsions containing silver carboxylates are cubic grains having an average particle size of from about 0.01 to about 1.5 μm, more preferred are those having an average particle size of from about 0.03 to about 1.0 μm, and most preferred are those having an average particle size of from about 0.03 to about 0.3 μm. Preferred silver halide grains for high-speed photothermographic use are tabular grains having an average thickness of at least 0.02 μm and up to and including 0.1 μm, an equivalent circular diameter of at least 0.5 μm and up to and including 8 μm and an aspect ratio of at least 5:1. More preferred are those having an average thickness of at least 0.03 μm and up to and including 0.08 μm, an equivalent circular diameter of at least 0.75 μm and up to and including 6 μm and an aspect ratio of at least 10:1.

The average size of the photosensitive silver halide grains is expressed by the average diameter if the grains are spherical, and by the average of the diameters of equivalent circles for the projected images if the grains are cubic or in other non-spherical shapes. Representative grain sizing methods are described in *Particle Size Analysis*, ASTM Symposium on Light Microscopy, R. P. Loveland, 1955, pp. 94–122, and in C. E. K. Mees and T. H. James, *The Theory of the Photographic Process*, Third Edition, Macmillan, New York, 1966, Chapter 2. Particle size measurements may be expressed in terms of the projected areas of grains or approximations of their diameters. These will provide reasonably accurate results if the grains of interest are substantially uniform in shape.

The one or more light-sensitive silver halides are preferably present in an amount of from about 0.005 to about 0.5 mole, more preferably from about 0.01 to about 0.25 mole, and most preferably from about 0.03 to about 0.15 mole, per mole of non-photosensitive source of reducible silver ions.

Chemical Sensitization

The photosensitive silver halides can be chemically sensitized using any useful compound that contains sulfur, tellurium, or selenium, or may comprise a compound containing gold, platinum, palladium, ruthenium, rhodium, iridium, or combinations thereof, a reducing agent such as a tin halide or a combination of any of these. The details of these materials are provided for example, in T. H. James, *The Theory of the Photographic Process*, Fourth Edition, Eastman Kodak Company, Rochester, N.Y., 1977, Chapter 5, pp. 149–169. Suitable conventional chemical sensitization procedures are also described in U.S. Pat. No. 1,623,499 (Sheppard et al.), U.S. Pat. No. 2,399,083 (Waller et al.), U.S. Pat. No. 3,297,447 (McVeigh), U.S. Pat. No. 3,297,446 (Dunn), U.S. Pat. No. 5,049,485 (Deaton), U.S. Pat. No. 5,252,455 (Deaton), U.S. Pat. No. 5,391,727 (Deaton), U.S. Pat. No. 5,912,111 (Lok et al.), and U.S. Pat. No. 5,759,761 (Lushington et al.), and EP 0 915 371 A1 (Lok et al.), all of which are incorporated herein by reference.

Mercaptotetrazoles and tetraazindenes as described in U.S. Pat. No. 5,691,127 (Daubendiek et al.), incorporated herein by reference, can also be used as suitable addenda for tabular silver halide grains.

Certain substituted and unsubstituted thiourea compounds can be used as chemical sensitizers including those described in U.S. Pat. No. 6,368,779 (Lynch et al.) that is incorporated herein by reference.

Still other additional chemical sensitizers include certain tellurium-containing compounds that are described in U.S. Pat. No. 6,699,647 (Lynch et al.), and certain selenium-containing compounds that are described in U.S. Pat. No. 6,620,577 (Lynch et al.), that are both incorporated herein by reference.

Combinations of gold(III)-containing compounds and either sulfur-, tellurium-, or selenium-containing compounds are also useful as chemical sensitizers as described in U.S. Pat. No. 6,423,481 (Simpson et al.) that is also incorporated herein by reference.

In addition, sulfur-containing compounds can be decomposed on silver halide grains in an oxidizing environment according to the teaching in U.S. Pat. No. 5,891,615 (Winslow et al.). Examples of sulfur-containing compounds that can be used in this fashion include sulfur-containing spectral sensitizing dyes.

Other useful sulfur-containing chemical sensitizing compounds that can be decomposed in an oxidized environment are the diphenylphosphine sulfide compounds described in copending and commonly assigned U.S. Ser. No. 10/731,251 (filed Dec. 9, 2003 by Simpson, Burleva, and Sakizadeh) which application is incorporated herein by reference.

The chemical sensitizers can be present in conventional amounts that generally depend upon the average size of the silver halide grains. Generally, the total amount is at least $10^{-10}$ mole per mole of total silver, and preferably from about $10^{-8}$ to about $10^{-2}$ mole per mole of total silver for silver halide grains having an average size of from about 0.01 to about 2 μm.

Spectral Sensitization

The photosensitive silver halides may be spectrally sensitized with one or more spectral sensitizing dyes that are known to enhance silver halide sensitivity to ultraviolet, visible, and/or infrared radiation. Non-limiting examples of spectral sensitizing dyes that can be employed include cyanine dyes, merocyanine dyes, complex cyanine dyes, complex merocyanine dyes, holopolar cyanine dyes, hemicyanine dyes, styryl dyes, and hemioxanol dyes. They may be added at any stage in chemical finishing of the photothermographic emulsion, but are generally added after chemical sensitization is achieved.

Suitable spectral sensitizing dyes such as those described in U.S. Pat. No. 3,719,495 (Lea), U.S. Pat. No. 4,396,712 (Kinoshita et al.), U.S. Pat. No. 4,439,520 (Kofron et al.), U.S. Pat. No. 4,690,883 (Kubodera et al.), U.S. Pat. No. 4,840,882 (Iwagaki et al.), U.S. Pat. No. 5,064,753 (Kohno et al.), U.S. Pat. No. 5,281,515 (Delprato et al.), U.S. Pat. No. 5,393,654 (Burrows et al.), U.S. Pat. No. 5,441,866 (Miller et al.), U.S. Pat. No. 5,508,162 (Dankosh), U.S. Pat. No. 5,510,236 (Dankosh), and U.S. Pat. No. 5,541,054 (Miller et al.), Japanese Kokai 2000-063690 (Tanaka et al.), 2000-112054 (Fukusaka et al.), 2000-273329 (Tanaka et al.), 2001-005145 (Arai), 2001-064527 (Oshiyama et al.), and 2001-154305 (Kita et al.), can be: used in the practice of the invention. All of the publications noted above are incorporated herein by reference. Useful spectral sensitizing dyes are also described in *Research Disclosure*, December 1989, item 308119, Section IV and *Research Disclosure*, 1994, item 36544, section V.

Teachings relating to specific combinations of spectral sensitizing dyes also include U.S. Pat. No. 4,581 329 (Sugimoto et al.), U.S. Pat. No. 4,582,786 (Ikeda et al.), U.S. Pat. No. 4,609,621 (Sugimoto et al.), U.S. Pat. No. 4,675,279 (Shuto et al.), U.S. Pat. No. 4,678,741 (Yamada et al.), U.S. Pat. No. 4,720,451 (Shuto et al.), U.S. Pat. No. 4,818,675 (Miyasaka et al.), U.S. Pat. No. 4,945,036 (Arai et al.), and U.S. Pat. No. 4,952,491 (Nishikawa et al.). All of the above publications and patents are incorporated herein by reference.

Also useful are spectral sensitizing dyes that decolorize by the action of light or heat as described in U.S. Pat. No. 4,524,128. (Edwards et al.) and Japanese Kokai 2001-109101 (Adachi), 2001-154305 (Kita et al.), and 2001-183770 (Hanyu et al.), all incorporated herein by reference.

Dyes may be selected for the purpose of supersensitization to attain much higher sensitivity than the sum of sensitivities that can be achieved by using each dye alone.

An appropriate amount of spectral sensitizing dye added is generally about $10^{-10}$ to $10^{-1}$ mole, and preferably, about $10^{-7}$ to $10^{-2}$ mole per mole of silver halide.

Non-Photosensitive Source of Reducible Silver Ions

The non-photosensitive source of reducible silver ions in the thermally developable materials is a silver-organic compound that contains reducible silver(I) ions. Such compounds are generally silver salts of silver organic coordinating ligands that are comparatively stable to light and form a silver image when heated to 50° C. or higher in the presence of an exposed photocatalyst (such as silver halide, when used in a photothermographic material) and a reducing agent composition.

The primary organic silver salt is often a silver salt of an aliphatic carboxylate (described below). Mixtures of silver salts of aliphatic carboxylates are particularly useful where the mixture includes at least silver behenate.

Useful silver carboxylates include silver salts of long-chain aliphatic carboxylic acids. The aliphatic carboxylic acids generally have aliphatic chains that contain 10 to 30, and preferably 15 to 28, carbon atoms. Examples of such preferred silver salts include silver behenate, silver arachidate, silver stearate, silver oleate, silver laurate, silver caprate, silver myristate, silver palmitate, silver maleate, silver fumarate, silver tartarate, silver furoate, silver linoleate, silver butyrate, silver camphorate, and mixtures thereof. Most preferably, at least silver behenate is used alone or in mixtures with other silver carboxylates.

Silver salts other than the silver carboxylates described above can be used, also. Such silver salts include silver salts of aliphatic carboxylic acids containing a thioether group as described in U.S. Pat. No. 3,330,663 (Weyde et al.), soluble silver carboxylates comprising hydrocarbon chains incorporating ether or thioether linkages or sterically hindered substitution in the α-(on a hydrocarbon group) or ortho- (on an aromatic group) position as described in U.S. Pat. No. 5,491,059 (Whitcomb), silver salts of dicarboxylic acids, silver salts of sulfonates as described in U.S. Pat. No. 4,504,575:.(Lee), silver salts of sulfosuccinates as described in EP 0 227 141A1 (Leenders et al.), silver salts of aromatic carboxylic acids (such as silver benzoate), silver salts of acetylenes as described, for example in U.S. Pat. No. 4,761, 361 (Ozaki et al.) and U.S. Pat. No. 4,775,613 (Hirai et al.), and silver salts of heterocyclic compounds containing mercapto or thione groups and derivatives as described in U.S. Pat. No. 4,123,274 (Knight et al.) and U.S. Pat. No. 3,785, 830 (Sullivan et al.).

It is also convenient to use silver half soaps such as an equimolar blend of silver carboxylate and carboxylic acid that analyzes for about 14.5% by weight solids of silver in the blend and that is prepared by precipitation from an aqueous solution of an ammonium or an alkali metal salt of a commercially available fatty carboxylic acid, or by addition of the free fatty acid to the silver soap.

The methods used for making silver soap emulsions are well known in the art and are disclosed in *Research Disclosure*, April 1983, item 22812*, Research Disclosure*, October 1983, item 23419, U.S. Pat. No. 3,985,565 (Gabrielsen et al.) and the references cited above.

Sources of non-photosensitive reducible silver ions can also be core-shell silver salts as described in U.S. Pat. No. 6,355,408 (whitcomb et al.) that is incorporated herein by reference, wherein a core has one or more silver salts and a shell has one or more different silver salts, as long as one of the silver salts is a silver carboxylate.

Other useful sources of non-photosensitive reducible silver ions are the silver dimer compounds that comprise two different silver salts as described in U.S. Pat. No. 6,472,131 (Whitcomb) that is incorporated herein by reference.

Still other useful sources of non-photosensitive reducible silver ions are the silver core-shell compounds comprising a primary core comprising one or more photosensitive silver halides, or one or more non-photosensitive inorganic metal salts or non-silver containing organic salts, and a shell at least partially covering the primary core, wherein the shell comprises one or more non-photosensitive silver salts, each of which silver salts comprises a organic silver coordinating ligand. Such compounds are described in U.S. Pat. No. 6,802,177 (Bokhonov et al.) that is incorporated herein by reference.

Organic silver salts that are particularly useful in organic solvent-based thermographic and photothermographic materials include silver carboxylates (both aliphatic and aromatic carboxylates), silver triazolates, silver sulfonates, silver sulfosuccinates, and silver acetylides. Silver salts of long-chain aliphatic carboxylic acids containing 15 to 28 carbon atoms and silver salts are particularly preferred.

Organic silver salts that are particularly useful in aqueous based thermographic and photothermographic materials include silver salts of compounds containing an imino group. Preferred examples of these compounds include, but are not limited to, silver salts of benzotriazole and substituted derivatives thereof (for example, silver methylbenzotriazole and silver 5-chlorobenzotriazole), silver salts of 1,2,4-triazoles or 1-H-tetrazoles such as phenylmercaptotetrazole as described in U.S. Pat. No. 4,220,709 (deMauriac), and silver salts of imidazoles and imidazole derivatives as described in U.S. Pat. No. 4,260,677 (Winslow et al.). Particularly useful silver salts of this type are the silver salts of benzotriazole and substituted derivatives thereof. A silver salt of a benzotriazole is particularly preferred in aqueous-based thermographic and photothermographic formulations.

Useful nitrogen-containing organic silver salts and methods of preparing them are described in copending and commonly assigned U.S. Ser. No. 10/826,417 (filed Apr. 16, 2004 by Zou and Hasberg) that is incorporated herein by reference. Such silver salts (particularly the silver benzotriazoles) are rod-like in shape and have an average aspect ratio of at least 3:1 and a width index for particle diameter of 1.25 or less. Silver salt particle length is generally less than 1 μm. Also useful are the silver salt-toner co-precipitated nano-crystals comprising a silver salt of a nitrogen-containing heterocyclic compound containing an imino group, and a silver salt comprising a silver salt of a mercaptotriazole. Such co-precipitated salts are described in copending and commonly assigned U.S. Ser. No. 10/935, 384 (filed Sep. 7, 2004 by Hasberg, Lynch, Chen-Ho, and Zou). Both of these patent applications are incorporated herein by reference.

The one or more non-photosensitive sources of reducible silver ions are preferably present in an amount of from about 5% to about 70%, and more preferably from about 10% to about 50%, based on the total dry weight of the emulsion layers. Alternatively stated, the amount of the sources of reducible silver ions is generally from about 0.001 to about 0.2 mol/$m^2$ of the dry photothermographic material (preferably from about 0.01 to about 0.05 mol/$m^2$).

The total amount of silver (from all silver sources) in the thermographic and photothermographic materials is generally at least 0.002 mol/$m^2$ and preferably from about 0.01 to about 0.05 mol/$m^2$.

Reducing Agents

The reducing agent (or reducing agent composition comprising two or more components) for the source of reducible silver ions can be any material (preferably an organic material) that can reduce silver(I) ion to metallic silver. The "reducing agent" is sometimes called a "developer" or "developing agent."

When a silver benzotriazole silver source is used, ascorbic acid reducing agents are preferred. An "ascorbic acid" reducing agent (also referred to as a developer or developing agent) means ascorbic acid, complexes, and derivatives thereof. An "ascorbic acid" reducing agent means ascorbic acid, complexes, and derivatives thereof. Ascorbic acid reducing agents are described in a considerable number of publications including U.S. Pat. No. 5,236,816 (Purol et al.) and references cited therein. Useful ascorbic acid developing agents include ascorbic acid and the analogues, isomers and derivatives thereof. Such compounds include, but are not limited to, D- or L-ascorbic acid, sugar-type derivatives thereof (such as sorboascorbic acid, γ-lactoascorbic acid, 6-desoxy-L-ascorbic acid, L-rhamnoascorbic acid, imino-6-desoxy-L-ascorbic acid, glucoascorbic acid, fucoascorbic acid, glucoheptoascorbic acid, maltoascorbic acid, L-arabosascorbic acid), sodium ascorbate, potassium ascorbate, isoascorbic acid (or L-erythroascorbic acid), and salts thereof (such as alkali metal, ammonium or others known in the art), endiol type ascorbic acid, an enaminol type ascorbic acid, a thioenol type ascorbic acid, and an enamin-thiol type ascorbic acid, as described in EP 0 585 792A1 (Passarella et al.), EP 0 573 700A1 (Lingier et al.), EP 0 588 408A1 (Hieronymus et al.), U.S. Pat. No. 5,089,819 (Knapp), U.S. Pat. No. 2,688,549 (James et al.), U.S. Pat. No. 5,278,035 (Knapp), U.S. Pat. No. 5,384,232 (Bishop et al.), U.S. Pat. No. 5,376,510 (Parker et al.), and U.S. Pat. No. 5,498,511 (Yamashita et al.), Japanese Kokai 7-56286 (Toyoda), and *Research Disclosure*, item 37152, March 1995. Mixtures of these developing agents can be used if desired.

Additionally useful are the ascorbic acid reducing agents described in copending and commonly assigned U.S. Ser. No. 10/764,704 (filed Jan. 26, 2004 by Ramsden, Lynch, Skoug, and Philip). Also useful are the solid particle dispersions of certain ascorbic acid esters that are prepared in the presence of a particle growth modifier that are described in copending and commonly assigned U.S. Ser. No. 10/935,645 (filed Sep. 7, 2004 by Brick, Ramsden, and Lynch). Both of these patent applications are incorporated herein by reference.

When a silver carboxylate silver source is used in a photothermographic material, one or more hindered phenol reducing agents are preferred. In some instances, the reducing agent composition comprises two or more components such as a hindered phenol developer and a co-developer that can be chosen from the various classes of co-developers and reducing agents described below. Ternary developer mixtures involving the further addition of contrast enhancing agents are also useful. Such contrast enhancing agents can be chosen from the various classes of reducing agents described below.

"Hindered phenol reducing agents" are compounds that contain only one hydroxy group on a given phenyl ring and have at least one additional substituent located ortho to the hydroxy group.

One type of hindered phenol includes hindered phenols and hindered naphthols.

Another type of hindered phenol reducing agent are hindered bis-phenols. These compounds contain more than one hydroxy group each of which is located on a different phenyl ring. This type of hindered phenol includes, for example, binaphthols (that is dihydroxybinaphthyls), biphenols (that is dihydroxybiphenyls), bis(hydroxynaphthyl) methanes, bis(hydroxyphenyl)methanes bis(hydroxyphenyl) ethers, bis(hydroxyphenyl)sulfones, and bis (hydroxyphenyl)thioethers, each of which may have additional substituents.

Preferred hindered phenol reducing agents are bis(hydroxyphenyl)methanes such as, bis(2-hydroxy-3-t-butyl-5-methylphenyl)methane (CAO-5), 1,1'-bis(2-hydroxy-3,5-dimethylphenyl)-3,5,5-trimethylhexane (NONOX® or PERMANAX WSO), and 1,1'-bis(2-hydroxy-3,5-dimethylphenyl)-isobutane (LOWINOX® 22IB46) Mixtures of hindered phenol reducing agents can be used if desired.

An additional class of reducing agents that can be used includes substituted hydrazines including the sulfonyl hydrazides described in U.S. Pat. No. 5,464,738 (Lynch et al.). Still other useful reducing agents are described in U.S. Pat. No. 3,074,809 (Owen), U.S. Pat. No. 3,094,417 (Workman), U.S. Pat. No. 3,080,254 (Grant, Jr.), U.S. Pat. No. 3,887,417 (Klein et al.), and U.S. Pat. No. 5,981,151 (Leenders et al.). All of these patents are incorporated herein by reference.

Additional reducing agents that may be used include amidoximes, azines, a combination of aliphatic carboxylic acid aryl hydrazides and ascorbic acid, a reductone and/or a hydrazine, piperidinohexose reductone or formyl-4-methylphenylhydrazine, hydroxamic acids, a combination of azines and sulfonamidophenols, α-cyanophenylacetic acid derivatives, reductones, indane-1,3-diones, chromans, 1,4-dihydropyridines, and 3-pyrazolidones.

Useful co-developer reducing agents can also be used as described in U.S. Pat. No. 6,387,605 (Lynch et al.) that is incorporated herein by reference. Additional classes of reducing agents that can be used as co-developers are trityl hydrazides and formyl phenyl hydrazides as described in U.S. Pat. No. 5,496,695 (Simpson et al.), 2-substituted malondialdehyde compounds as described in U.S. Pat. No. 5,654,130 (Murray), and 4-substituted isoxazole compounds as described in U.S. Pat. No. 5,705,324 (Murray). Additional developers are described in U.S. Pat. No. 6,100,022 (Inoue et al.). All of the patents above are incorporated herein by reference. Yet another class of co-developers includes substituted acrylonitrile compounds such as the compounds identified as HET-01 and HET-02 in U.S. Pat. No. 5,635,339 (Murray) and CN-01 through CN-13 in U.S. Pat. No. 5,545,515 (Murray et al.).

Various contrast enhancing agents can be used in some photothermographic materials with specific co-developers. Examples of useful contrast enhancing agents include, but are not limited to, hydroxylamines, alkanolamines and ammonium phthalamate compounds as described in U.S. Pat. No. 5,545,505 (Simpson), hydroxamic acid compounds as described for example, in U.S. Pat. No. 5,545,507 (Simpson et al.), N-acylhydrazine compounds as described in U.S. Pat. No. 5,558,983 (Simpson et al.), and hydrogen atom donor compounds as described in U.S. Pat. No. 5,637,449 (Harring et al.). All of the patents above are incorporated herein by reference.

When used with a silver carboxylate silver source in a thermographic material, preferred reducing agents are aromatic di- and tri-hydroxy compounds having at least two hydroxy groups in ortho- orpara-relationship on the same aromatic nucleus. Examples are hydroquinone and substituted hydroquinones, catechols, pyrogallol, gallic acid and gallic acid esters (for example, methyl gallate, ethyl gallate, propyl gallate), and tannic acid.

Particularly preferred are catechol-type reducing agents having no more than two hydroxy groups in an ortho-relationship.

One particularly preferred class of catechol-type reducing agents are benzene compounds in which the benzene nucleus is substituted by no more than two hydroxy groups which are present in 2,3-position on the nucleus and have in the 1-position of the nucleus a substituent linked to the nucleus by means of a carbonyl group. Compounds of this type include 2,3-dihydroxy-benzoic acid, and 2,3-dihydroxy-benzoic acid esters (such as methyl 2,3-dihydroxy-benzoate, and ethyl 2,3-dihydroxy-benzoate).

Another particularly preferred class of catechol-type reducing agents are benzene compounds in which the benzene nucleus is substituted by no more than two hydroxy groups which are present in 3,4-position on the nucleus and have in the 1-position of the nucleus a substituent linked to the nucleus by means of a carbonyl group. Compounds of this type include, for example, 3,4-dihydroxy-benzoic acid, 3-(3,4-dihydroxy-phenyl)-propionic acid, 3,4-dihydroxy-benzoic acid esters (such as methyl 3,4-dihydroxy-benzoate, and ethyl 3,4-dihydroxy-benzoate), 3,4-dihydroxy-benzaldehyde, 3,4-dihydroxy-benzonitrile, and phenyl-(3,4-dihydroxyphenyl)ketone. Such compounds are described, for example, in U.S. Pat. No. 5,582,953 (Uyttendaele et al.).

Still another useful class of reducing agents includes polyhydroxy spiro-bis-indane compounds described as photographic tanning agents in U.S. Pat. No. 3,440,049 (Moede).

Aromatic di- and tri-hydroxy reducing agents can also be used in combination with hindered phenol reducing agents and further in combination with one or more high contrast co-developing agents and co-developer contrast-enhancing agents).

The reducing agent (or mixture thereof) described herein is generally present as 1 to 10% (dry weight) of the emulsion layer. In multilayer constructions, if the reducing agent is added to a layer other than an emulsion layer, slightly higher proportions, of from about 2 to 15 weight % may be more desirable. Co-developers may be present generally in an amount of from about 0.001% to about 1.5% (dry weight) of the emulsion layer coating.

Other Addenda

The thermally developable materials can also contain other additives such as shelf-life stabilizers, antifoggants, contrast enhancers, development accelerators, acutance dyes, post-processing stabilizers or stabilizer precursors, thermal solvents (also known as melt formers), and other image-modifying agents as would be readily apparent to one skilled in the art.

To further control the properties of photothermographic materials, (for example, contrast, $D_{min}$, speed, or fog), it may be preferable to add one or more heteroaromatic mercapto compounds or heteroaromatic disulfide compounds of the formulae Ar—S-$M^1$ and Ar—S—S—Ar, wherein $M^1$ represents a hydrogen atom or an alkali metal atom and Ar represents a heteroaromatic ring or fused heteroaromatic ring containing one or more of nitrogen, sulfur, oxygen, selenium, or tellurium atoms. Preferably, the heteroaromatic ring comprises benzimidazole, naphthimidazole, benzothiazole, naphthothiazole, benzoxazole, naphthoxazole, benzoselenazole, benzotellurazole, iridazole, oxazole, pyrazole, triazole, thiazole, thiadiazole, tetrazole, triazine, pyrimidine, pyridazine, pyrazine, pyridine, purine, quinoline, or quinazolinone. Useful heteroaromatic mercapto compounds are described as supersensitizers for infrared photothermographic materials in EP 0 559 228B1 (Philip Jr. et al.).

Heteroaromatic mercapto compounds are most preferred. Examples of preferred heteroaromatic mercapto compounds are 2-mercaptobenzimidazole, 2-mercapto-5-methylbenzimidazole, 2-mercaptobenzothiazole and 2-mercaptobenzoxazole, and mixtures thereof.

A heteroaromatic mercapto compound is generally present in an emulsion layer in an amount of at least 0.0001 mole (preferably from about 0.001 to about 1.0 mole) per mole of total silver in the emulsion layer.

The photothermographic materials can be further protected against the production of fog and can be stabilized against loss of sensitivity during storage. Suitable antifoggants and stabilizers that can be used alone or in combination include thiazolium salts as described in U.S. Pat. No. 2,131,038 (Brooker) and U.S. Pat. No. 2,694,716 (Allen), azaindenes as described in U.S. Pat. No. 2,886,437 (Piper), triazaindolizines as described in U.S. Pat. No. 2,444,605 (Heimbach), urazoles as described in U.S. Pat. No. 3,287,135 (Anderson), sulfocatechols as described in U.S. Pat. No. 3,235,652 (Kennard), the oximes described in GB 623,448 (Carrol et al.), polyvalent metal salts as described in U.S. Pat. No. 2,839,405 (Jones), thiuronium salts as described in U.S. Pat. No. 3,220,839 (Herz), palladium, platinum, and gold salts as described in U.S. Pat. No. 2,566,263 (Trirelli) and U.S. Pat. No. 2,597,915 (Damshroder).

Preferably, the photothermographic materials include one or more polyhalo compounds that function as antifoggants and/or stabilizers that contain one or more polyhalo substituents including but not limited to, dichloro, dibromo, trichloro, and tribromo groups. The antifoggants can be aliphatic, alicyclic or aromatic compounds, including aromatic heterocyclic and carbocyclic compounds. Particularly useful antifoggants are polyhalo antifoggants, such as those having a $—SO_2C(X')_3$ group wherein X' represents the same or different halogen atoms. Preferred compounds are those having $—SO_2CBr_3$ groups as described in U.S. Pat. No. 3,874,946 (Costa et al.), U.S. Pat. No. 5,374,514 (Kirk et al.), U.S. Pat. No. 5,460,938 (Kirk et al.), and U.S. Pat. No. 5,594,143 (Kirk et al.). Non-limiting examples of such compounds include, 2-tribromomethylsulfonylquinoline, 2-tribromomethylsulfonylpyridine, tribromomethylbenzene, and substituted derivatives of these compounds. If present, these polyhalo antifoggants are present in an amount of at least 0.005 mol/mol of total silver, preferably in an amount of from about 0.02 to about 0.10 mol/mol of total silver, and more preferably in an amount of from 0.029 to 0.10 mol/mol of total silver.

Stabilizer precursor compounds capable of releasing stabilizers upon application of heat during development can also be used as described in U.S. Pat. No. 5,158,866 (Simpson et al.), U.S. Pat. No. 5,175,081 (Krepski et al.), U.S. Pat. No. 5,298,390 (Sakizadeh et al.), and U.S. Pat. No. 5,300,420 (Kenney et al.).

In addition, certain substituted-sulfonyl derivatives of benzotriazoles (for example alkylsulfonylbenzotriazoles and arylsulfonylbenzotriazoles) may be useful as described in U.S. Pat. No. 6,171,767 (Kong et al.).

Other useful antifoggants/stabilizers are described in U.S. Pat. No. 6,083,681 (Lynch et al.). Still other antifoggants are hydrobromic acid salts of heterocyclic compounds (such as pyridinium hydrobromide perbromide) as described in U.S. Pat. No. 5,028,523 (Skoug), benzoyl acid compounds as described in U.S. Pat. No. 4,784,939 (Pham), substituted propenenitrile compounds as described in U.S. Pat. No. 5,686,228 (Murray et al.), silyl blocked compounds as described in U.S. Pat. No. 5,358,843 (Sakizadeh et al.), vinyl sulfones as described in U.S. Pat. No. 6,143,487 (Philip, Jr. et al.), diisocyanate compounds as described in EP 0 600 586A1 (Philip, Jr. et al.), and tribromomethylketones as described in EP 0 600 587A1 (Oliff et al.).

The photothermographic materials may also include one or more thermal solvents (or melt formers) such as disclosed in U.S. Pat. No. 3,438,776 (Yudelson), U.S. Pat. No. 5,250,386 (Aono et al.), U.S. Pat. No. 5368,979 (Freedman et al.), U.S. Pat. No. 5,716,772 (Taguchi et al.), and U.S. Pat. No. 6,013,420 (Windender).

It is often advantageous to include a base-release agent or base precursor in photothermographic materials. Representative base-release agents or base precursors include guanidinium compounds and other compounds that are known to release a base but do not adversely affect photographic silver halide materials (such as phenylsulfonyl acetates) as described in U.S. Pat. No. 4,123,274 (Knight et al.).

"Toners" or derivatives thereof that improve the image are highly desirable components of the thermally developable materials. Toners (also known as "toning agents") are compounds that when added to the imaging layer(s) shift the color of the developed silver image from yellowish-orange to brown-black or blue-black and/or increase the rate ofdevelopment. Generally, one or more toners described herein are present in an amount of about 0.01% by weight to about 10%, and more preferably about 0.1% by weight to about 10% by weight, based on the total dry weight of the layer in which it is included. Toners may be incorporated in the photothermographic emulsion layer(s) or in an adjacent non-imaging layer.

Compounds useful as toners are described in U.S. Pat. No. 3,080,254 (Grant, Jr.), U.S. Pat. No. 3,847,612 (Winslow), U.S. Pat. No. 4,123,282 (Winslow), U.S. Pat. No. 4,082,901 (Laridon et al.), U.S. Pat. No. 3,074,809 (Owen), U.S. Pat. No. 3,446,648 (Workman), U.S. Pat. No. 3,844,797 (Willems et al.), U.S. Pat. No. 3,951,660 (Hagemann et al.), and U.S. Pat. No. 5,599,647 (Defieuw et al.) and GB 1,439,478 (AGFA).

Phthalazine and phthalazine derivatives [such as those described in U.S. Pat. No. 6,146,822 (Asanuma et al.), incorporated herein by reference], phthalazinone, and phthalazinone derivatives are particularly useful toners.

Additional useful toners are substituted and unsubstituted mercaptotriazoles as described in U.S. Pat. No. 3,832,186 (Masuda et al.), U.S. Pat. No. 6,165,704 (Miyake et al.), U.S. Pat. No. 5,149,620 (Simpson et al.), and U.S. Pat. No. 6,713,240 (Lynch et al.), and U.S. patent application Publication 2004/0013984 (Lynch et al.), all of which are incorporated herein by reference.

Also useful are the phthalazine compounds described in U.S. Pat. No. 6,605,418 (Ransden et al.), the triazine thione compounds described in U.S. Pat. No. 6,703,191 (Lynch et. al.), and the heterocyclic disulfide compounds described in U.S. Pat. No. 6,737,227 (Lynch et al.), all of which are incorporated herein by reference.

Further useful are the silver salt-toner co-precipitated nano-crystals described in U.S. Ser. No. 10/935,384 (noted above).

The photothermographic materials can also include one or more image stabilizing compounds that are usually incorporated in a "backside" layer. Such compounds can include phthalazinone and its derivatives, pyridazine and its derivatives, benzoxazine and benzoxazine derivatives, benzothiazine dione and its derivatives, and quinazoline dione and its derivatives, particularly as described in U.S. Pat. No. 6,599,685 (Kong). Other useful backside image stabilizers include anthracene compounds, coumarin compounds, benzophenone compounds, benzotriazole compounds, naphthalic acid imide compounds, pyrazoline compounds, or compounds described in U.S. Pat. No. 6,465,162 (Kong et al), and GB 1,565,043 (Fuji Photo). All of these patents and patent applications are incorporated herein by reference.

Phosphors are materials that emit infrared, visible, or ultraviolet radiation upon excitation and can be incorporated into the photothermographic materials. Particularly useful phosphors are sensitive to X-radiation and emit radiation primarily in the ultraviolet, near-ultraviolet, or visible regions of the spectrum (that is, from about 100 to about 700 nm). An intrinsic phosphor is a material that is naturally (that is, intrinsically) phosphorescent. An "activated" phosphor is one composed of a basic material that may or may not be an intrinsic phosphor, to which one or more dopant(s) has been intentionally added. These dopants or activators "activate" the phosphor and cause it to emit ultraviolet or visible radiation. Multiple dopants may be used and thus the phosphor would include both "activators" and "co-activators."

Any conventional or useful phosphor can be used, singly or in mixtures. For example, useful phosphors are described in numerous references relating to fluorescent intensifying screens as well as U.S. Pat. No. 6,440,649 (Simpson et al.) and U.S. Pat. No. 6,573,033 (Simpson et al.) that are directed to photothermographic materials, both of which references are incorporated herein.

Some particularly useful phosphors are primarily "activated" phosphors known as phosphate phosphors and borate phosphors. Examples of these phosphors are rare earth phosphates, yttrium phosphates, strontium phosphates, or strontium fluoroborates (including cerium activated rare earth or yttrium phosphates, or europium activated strontium fluoroborates) as described in U.S. Ser. No. 10/826,500 (filed Apr. 16, 2004 by Simpson, Sieber, and Hansen).

The one or more phosphors can be present in the photothermographic materials in an amount of at least 0.1 mole per mole, and preferably from about 0.5 to about 20 mole, per mole of total silver in the photothermographic material. As noted above, generally, the amount of total silver is at least 0.002 mol/$m^2$. While the phosphors can be incorporated into any imaging layer on one or both sides of the support, it is preferred that they be in the same layer(s) as the photosensitive silver halide(s) on one or both sides of the support.

Binders

The photosensitive silver halide (if present), the non-photosensitive source of reducible silver ions, the reducing agent composition, and any other imaging layer additives are generally combined with one or more binders that are generally hydrophobic or hydrophilic in nature. Thus, either aqueous or organic solvent-based formulations can be used to prepare the thermally developable materials of this invention. Mixtures of either or both types of binders can also be used. It is preferred that the binder be selected from predominantly hydrophobic polymeric materials (at least 50 dry weight % of total binders).

Examples of typical hydrophobic binders include polyvinyl acetals, polyvinyl chloride, polyvinyl acetate, cellulose acetate, cellulose acetate butyrate, polyolefins, polyesters, polystyrenes, polyacrylonitrile, polycarbonates, methacrylate copolymers, maleic anhydride ester copolymers, butadiene-styrene copolymers, and other materials readily apparent to one skilled in the art. Copolymers (including terpolymers) are also included in the definition of polymers. The polyvinyl acetals (such as polyvinyl butyral and polyvinyl formal) and vinyl copolymers (such as polyvinyl acetate and polyvinyl chloride) are particularly preferred. Particularly suitable binders are polyvinyl butyral resins that are available under the names BUTVAR® (Solutia, Inc., St. Louis, Mo.) and PIOLOFORM® (Wacker Chemical Company, Adrian, Mich.).

Hydrophilic binders or water-dispersible polymeric latex polymers can also be present in the formulations. Examples of useful hydrophilic binders include, but are not limited to, proteins and protein derivatives, gelatin and gelatin-like derivatives (hardened or unhardened), cellulosic materials such as hydroxymethyl cellulose and cellulosic esters, acrylamide/methacrylamide polymers, acrylic/methacrylic polymers polyvinyl pyrrolidones, polyvinyl alcohols, poly(vinyl lactams), polymers of sulfoalkyl acrylate or methacrylates, hydrolyzed polyvinyl acetates, polyacrylamides, polysaccharides and other synthetic or naturally occurring vehicles commonly known for use in aqueous-based photographic emulsions (see for example, *Research Disclosure*, item 38957, noted above). Cationic starches can also be used as a peptizer for tabular silver halide grains as described in U.S. Pat. No. 5,620,840 (Maskasky) and U.S. Pat. No. 5,667,955 (Maskasky).

Hardeners for various binders may be present if desired. Useful hardeners are well known and include diisocyanate compounds as described in EP 0 600 586 B1 (Philip, Jr. et al.), vinyl sulfone compounds as described in U.S. Pat. No. 6,143,487 (Philip, Jr. et al.) and EP 0 640 589 A1 (Gathmann et al.), aldehydes and various other hardeners as described in U.S. Pat. No. 6,190,822 (Dickerson et al.). The hydrophilic binders used in the photothermographic materials are generally partially or fully hardened using any conventional hardener. Useful hardeners are well known and are described, for example, in T. H. James, *The Theory of the Photographic Process*, Fourth Edition, Eastman Kodak Company, Rochester, N.Y., 1977, Chapter 2, pp. 77–8.

Where the proportions and activities of the thermally developable materials require a particular developing time and temperature, the binder(s) should be able to withstand those conditions. When a hydrophobic binder is used, it is preferred that the binder (or mixture thereof) does not decompose or lose its structural integrity at 120° C. for 60 seconds. When a hydrophilic binder is used, it is preferred that the binder does not decompose or lose its structural integrity at 150° C. for 60 seconds. It is more preferred that it does not decompose or lose its structural integrity at 177° C. for 60 seconds.

The polymer binder(s) is used in an amount sufficient to carry the components dispersed therein. Preferably, a binder is used at a level of from about 10% to about 90% by weight (more preferably at a level of from about 20% to about 70% by weight) based on the total dry weight of the layer. It is particularly useful that the thermally developable materials include at least 50 weight % hydrophobic binders in both imaging and non-imaging layers on both sides of the support (and particularly the imaging side of the support).

Support Materials

The thermally developable materials comprise a polymeric support that is preferably a flexible, transparent film that has any desired thickness and is composed of one or more polymeric materials. They are required to exhibit dimensional stability during thermal development and to have suitable adhesive properties with overlying layers. Useful polymeric materials for making such supports include polyesters [such as poly(ethylene terephthalate) and poly(ethylene naphthalate)], cellulose acetate and other cellulose esters, polyvinyl acetal, polyolefins, polycarbonates, and polystyrenes. Preferred supports are composed of polymers having good heat stability, such as polyesters and polycarbonates. Support materials may also be treated or annealed to reduce shrinkage and promote dimensional stability.

It is also useful to use supports comprising dichroic mirror layers as described in U.S. Pat. No. 5,795,708 (Boutet), incorporated herein by reference. Also useful are transparent, multilayer, polymeric supports comprising numerous alternating layers of at least two different polymeric materials as described in U.S. Pat. No. 6,630,283 (Simpson et al.), incorporated herein by reference.

Opaque supports can also be used, such as dyed polymeric films and resin-coated papers that are stable to high temperatures.

Support materials can contain various colorants, pigments, antihalation or acutance dyes if desired. For example, the support can include one or more dyes that provide a blue color in the resulting imaged film. Support materials may be treated using conventional procedures (such as corona discharge) to improve adhesion of overlying layers, or subbing or other adhesion-promoting layers can be used.

Thermographic and Photothermographic Formulations and Constructions

An organic solvent-based coating formulation for the thermographic and photothermographic emulsion layer(s) can be prepared by mixing the various components with one or more binders in a suitable organic solvent system that usually includes one or more solvents such as toluene, 2-butanone (methyl ethyl ketone), acetone, or tetrahydrofuran or mixtures thereof.

Alternatively, the desired imaging components can be formulated with a hydrophilic binder (such as gelatin, a gelatin-derivative, or a latex) in water or water-organic solvent mixtures to provide aqueous-based coating formulations.

Thermally developable materials can contain plasticizers and lubricants such as poly(alcohols) and diols as described in U.S. Pat. No. 2,960,404 (Milton et al.), fatty acids or esters as described in U.S. Pat. No. 2,588,765 (Robijns) and U.S. Pat. No. 3,121,060 (Duane), and silicone resins as described in GB 955,061 (DuPont). The materials can also contain inorganic and organic matting agents as described in U.S. Pat. No. 2,992,101 (Jelley et al.) and U.S. Pat. No. 2,701,245 (Lynn). Polymeric fluorinated surfactants may also be useful in one or more layers as described in U.S. Pat. No. 5,468,603 (Kub).

U.S. Pat. No. 6,436,616 (Geisler et al.), incorporated herein by reference, describes various means of modifying photothermographic materials to reduce what is known as the "woodgrain" effect, or uneven optical density.

Layers to promote adhesion of one layer to another are also known, as described in U.S. Pat. No. 5,891,610 (Bauer et al.), U.S. Pat. No. 5,804,365 (Bauer et al.), and U.S. Pat. No. 4,741,992 (Przezdziecki). Adhesion can also be promoted using specific polymeric adhesive materials as described in U.S. Pat. No. 5,928,857 (Geisler et al.).

Layers to reduce emissions from the material may also be present, including the polymeric barrier layers described in U.S. Pat. No. 6,352,819 (Kenney et al.), U.S. Pat. No. 6,352,820 (Bauer et al.), U.S. Pat. No. 6,420,102 (Bauer et al.), U.S. Pat. No. 6,667,148 (Rao et al.), and U.S. Pat. No. 6,746,831 (Hunt), all incorporated herein by reference.

Mottle and other surface anomalies can be reduced by incorporation of a fluorinated polymer as described in U.S. Pat. No. 5,532,121 (Yonkoski et al.) or by using particular drying techniques as described, for example in U.S. Pat. No. 5,621,983 (Ludemann et al.).

The thermally developable materials can also include one or more antistatic or conductive layers on the frontside of the support. Such layers may contain metal antimonates as described above, or other conventional antistatic agents known in the art for this purpose such as soluble salts (for example, chlorides or nitrates), evaporated metal layers, or ionic polymers such as those described in U.S. Pat. No. 2,861,056 (Minsk) and U.S. Pat. No. 3,206,312 (Sterman et al.), or insoluble inorganic salts such as those described in U.S. Pat. No. 3,428,451 (Trevoy), electroconductive underlayers such as those described in U.S. Pat. No. 5,310,640 (Markin et al.), electronically-conductive metal antimonate particles such as those described above and in U.S. Pat. No. 5,368,995 (Christian et al.), electrically-conductive metal-containing particles dispersed in a polymeric binder such as those described in U.S. Pat. No. 5,547,821 (Melpolder et al.), and fluorochemicals that are described in numerous publications.

The photothermographic and thermographic materials may also usefully include, a magnetic recording material as described in *Research Disclosure*, Item 34390, November 1992, or a transparent magnetic recording layer such as a layer containing magnetic particles on the underside of a transparent support as described in U.S. Pat. No. 4,302,523 (Audran et al.).

To promote image sharpness, photothermographic materials can contain one or more layers containing acutance and/or antihalation dyes. These dyes are chosen to have absorption close to the exposure wavelength and are designed to absorb scattered light. One or more antihalation compositions may be incorporated into one or more antihalation backing layers, underlayers, or overcoats. Additionally, one or more acutance dyes may be incorporated into one or more frontside layers.

Dyes useful as antihalation and acutance dyes include squaraine dyes as described in U.S. Pat. No. 5,380,635 (Gomez et al.), and U.S. Pat. No. 6,063,560 (Suzuki et al.), and EP 1 083 459A1 (Kimura), indolenine dyes as described in EP 0 342 810A1 (Leichter), and cyanine dyes as described in U.S. Pat. No. 6,689,547 (Hunt et al.), all incorporated herein by reference.

It is also useful to employ compositions including acutance or antihalation dyes that will decolorize or bleach with heat during processing, as described in U.S. Pat. No. 5,135,842 (Kitchin et al.), U.S. Pat. No. 5,266,452 (Kitchin et al.), U.S. Pat. No. 5,314,795 (Helland et al.), and U.S. Pat. No. 6,306,566, (Sakurada et al.), and Japanese Kokai 2001-142175 (Hanyu et al.) and 2001-183770 (Hanye et al.). Useful bleaching compositions are also described in Japanese Kokai 11-302550 (Fujiwara), 2001-109101 (Adachi), 2001-51371 (Yabuki et al.), and 2000-029168 (Noro). All of the noted publications are incorporated herein by reference.

Other useful heat-bleachable antihalation compositions can include an infrared radiation absorbing compound such as an oxonol dye or various other compounds used in combination with a hexaarylbiimidazole (also known as a "HABI"), or mixtures thereof. HABI compounds are described in U.S. Pat. No. 4,196,002 (Levinson et al.), U.S. Pat. No. 5,652,091 (Perry et al.), and U.S. Pat. No. 5,672,562 (Perry et al.), all incorporated herein by reference. Examples of such heat-bleachable compositions are described in U.S. Pat. No. 6,455,210 (Irving et al.), U.S. Pat. No. 6,514,677 (Ramsden et al.), and U.S. Pat. No. 6,558,880 (Goswami et al.), all incorporated herein by reference.

Under practical conditions of use, these compositions are heated to provide bleaching at a temperature of at least 90° C. for at least 0.5 seconds (preferably, at a temperature of from about 100° C. to about 200° C. for from about 5 to about 20 seconds).

In some embodiments, the thermally developable materials include a surface protective layer over one or more imaging layers on one or both sides of the support. In other embodiments, the materials include a surface protective layer on the same side of the support as the one or more emulsion layers and a layer on the backside that includes the required buried conductive antistatic composition (with or without an antihalation composition or layer). At least one separate, non-conductive, backside overcoat layer is included in these embodiments. Preferably the buried conductive antistatic layer and the at least one overcoat layer are simultaneously coated.

The thermally developable formulations can be coated by various coating procedures including wire wound rod coating, dip coating, air knife coating, curtain coating, slide coating, slot-die coating, or extrusion coating using hoppers of the type described in U.S. Pat. No. 2,681,294 (Beguin). Layers can be coated one at a time, or two or more layers can be coated simultaneously by the procedures described in U.S. Pat. No. 2,761,791 (Russell), U.S. Pat. No. 4,001,024 (Dittman et al.), U.S. Pat. No. 4,569,863 (Keopke et al.), U.S. Pat. No. 5,340,613 (Hanzalik et al.), U.S. Pat. No. 5,405,740 (LaBelle), U.S. Pat. No. 5,415,993 (Hanzalik et al.), U.S. Pat. No. 5,525,376 (Leonard), U.S. Pat. No. 5,733,608 (Kessel et al.), U.S. Pat. No. 5,849,363 (Yapel et al.), U.S. Pat. No. 5,843,530 (Jerry et al.), and U.S. Pat. No. 5,861,195 (Bhave et al.), and GB 837,095 (Ilford). A typical coating gap for the emulsion layer can be from about 10 to about 750 μm, and the layer can be dried in forced air at a temperature of from about 20° C. to about 100° C. It is preferred that the thickness of the layer be selected to provide maximum image densities greater than about 0.2, and more preferably, from about 0.5 to 5.0 or more, as measured by an X-rite Model 361/V Densitometer equipped with 301 Visual Optics, available from X-rite Corporation, (Granville, Mich.).

Subsequently to or simultaneously with application of the emulsion formulation to the support, a protective overcoat formulation can be applied over the emulsion formulation.

Preferably, two or more layer formulations are applied simultaneously to a support using slide coating, the first layer being coated on top of the second layer while the second layer is still wet. The first and second fluids used to coat these layers can be the same or different solvents.

In other embodiments, a "carrier" layer formulation comprising a single-phase mixture of the two or more polymers described above may be applied directly onto the support and thereby located underneath the emulsion layer(s) as described in U.S. Pat. No. 6,355,405 (Ludemann et al.), incorporated herein by reference. The carrier layer formulation can be applied simultaneously with application of the emulsion layer formulation.

Buried Backside Conductive Compositions and Layers

The thermally developable materials have at least one buried conductive layer on opposing or backside (non-imaging side) of the polymeric support along with one or more additional overcoat layers. Such additional layers include an optional antihalation layer, a layer containing a matting agent (such as silica), or a combination of such layers. Alternatively, one of the additional backside layers can perform several or all of the desired additional functions.

The metal oxides useful in this invention are generally provided for formulation in inorganic colloidal or sol form in a suitable solvent such as water or a water-miscible solvent such as methanol or other low molecular weight alcohols. The inorganic metal oxide colloids include oxide colloids of zinc, magnesium, silicon, calcium, aluminum, strontium, barium, zirconium, titanium, manganese, iron, cobalt, nickel, tin, indium, molybdenum, or vanadium, or mixtures of these metal oxide colloids. The metal oxides can be doped with other metals such as aluminum, indium, niobium, tantalum or antimony. Tin oxides and the zinc antimonates described below are preferred.

The at least one buried conductive layer on the backside (non-imaging side) of the support includes clusters of metal oxide nanoparticles. Preferably, there are multiple backside layers and at least one non-imaging conductive layer is a "buried" conductive layer and a protective overcoat layer is disposed over it. More preferably the conductive layer is a "buried" carrier layer. The metal oxide clusters are preferably clusters of non-acicular metal antimonate nanoparticles.

The preferred non-acicular metal antimonate nanoparticles generally have a composition represented by the following Structure I or II:

$$M^{+2}Sb^{+5}{}_2O_6 \quad (I)$$

wherein M is zinc, nickel, magnesium, iron, copper, manganese, or cobalt, $$M_a{}^{+3}Sb^{+5}O_4 \quad (II)$$

wherein $M_a$ is indium, aluminum, scandium, chromium, iron, or gallium.

Thus, these nanoparticles are generally metal oxides that are doped with antimony.

Most preferably, the non-acicular metal antimonate nanoparticles are composed of zinc antimonate ($ZnSb_2O_6$). Several conductive metal antimonates are commercially available from Nissan Chemical America Corporation including the preferred non-acicular zinc antimonate ($ZnSb_2O_6$) nanoparticles that are available as a 60% (solids) organosol dispersion in methanol under the tradename CELNAX® CX-Z641M.

Alternatively, the metal antimonate particles can be prepared using methods described for example in U.S. Pat. No. 5,457,013 (noted above) and references cited therein.

The metal antimonate nanoparticles in the buried, backside conductive layer are predominately in the form of clusters of non-acicular particles as opposed to "acicular" particles. By "non-acicular" particles is meant not needle-like, that is, not acicular. Thus, the shape of the metal antimonate nanoparticles can be granular, spherical, ovoid, cubic, rhombic, tabular, tetrahedral, octahedral, icosahedral, truncated cubic, truncated rhombic, or any other non-needle like shape.

Generally, the methanolic organosol dispersion of these metal oxide nanoparticles have an average diameter of from about 15 to about 20 nm as measured across the largest particle dimension using the BET method.

The clusters of metal oxide nanoparticles are generally present in an amount sufficient to provide a backside water electrode resistivity (WER) of $1\times10^{12}$ ohms/sq or less and preferably $1\times10^{11}$ ohms/sq or less at 70° F. (21.1° C.) and 50% relative humidity.

The clusters of conductive metal oxide nanoparticles generally comprise from about more than 40 and up to 65% (preferably from 45 to about 55%) by weight of the dry backside conductive layer. Another way of defining the amount of particles is that they are generally present in the backside conductive layer in an amount of from about 0.05 to about 2 g/m$^2$. (preferably from about 0.1 to about 1 g/m$^2$, and more preferably from about 0.2 to about 0.6 g/m$^2$) of the dry layer coverage. Mixtures of different types of conductive metal oxide particles can be used if desired.

The backside conductive layer includes one or more binders (described in detail below) in an amount to provide a total binder to conductive metal oxide ratio of more than 0.55:1 and preferably of from about 0.7:1 to about 1.1:1, based on dry weights. The optimum ratio of total binder to conductive metal oxide can vary depending upon the specific binders used, the conductive metal oxide cluster size, the coverage of conductive metal oxide, and the dry thickness of the conductive layer. One skilled in the art would be able to determine the optimum parameters to achieve the desired conductivity and adhesion to adjacent layers and/or support.

The clusters of conductive metal oxide are present in one or more backside conductive layers that are "buried" on the backside of the support. The relationship of the buried backside conductive layer(s), and the layer or layers immediately adjacent is important because the types of polymers and binders in these layers are designed to provide excellent adhesion to one another as well as acceptably dispersing the clusters of conductive metal oxide and/or or layer components, and are readily coated simultaneously.

The buried backside conductive layer may also be relatively thin. For example, it can have a dry thickness of from about 0.05 to about 1.1 μm (preferably from about 0.2 to about 0.8 μm, and most preferably of from about 0.4 to about 0.7 μm). The thin "buried" backside conductive layers are useful as "carrier" layers. The term "carrier layer" is often used when multiple layers are coated using slide coating and the buried backside conductive layer is a thin layer adjacent to the support.

In one preferred embodiment, the buried backside conductive layer is a carrier layer and is directly disposed on the support without the use of primer or subbing layers, or other adhesion-promoting means such as support surface treatments. Thus, the support can be used in an "untreated" and "uncoated" form when a buried backside conductive carrier layer is used. The carrier layer formulation is applied simultaneously with application of these other backside layer formulations and is thereby located underneath these other backside layers. In a preferred construction, the backside conductive carrier layer formulation comprises a single-phase mixture of the two or more polymers described above and clusters of non-acicular metal antimonate particles.

The layer directly disposed over the conductive layers is known herein as a "first" layer and can be known as a "protective" layer that can be the outermost topcoat layer or have further layer(s) disposed thereon. This first layer comprises a film-forming polymer. The backside conductive layer immediately underneath comprises clusters of the metal oxide in a mixture of two or more polymers that includes a "first" polymer serving to promote adhesion of the backside conductive layer directly to the polymeric support, and a "second" polymer that is different than and forms a single-phase mixture with the first polymer.

It is preferred that film-forming polymer of the first layer and the second polymer of the backside conductive layer are the same or different polyvinyl acetal resins, polyester resins, cellulosic polymers, maleic anhydrideester copolymers, or vinyl polymers. It is more preferred that the film-forming polymer of the first layer and the second polymer of the backside conductive layer is a polyvinyl acetal such as polyvinyl butyral or cellulose ester such as cellulose acetate butyrate. It is preferred that the "first" polymer of the backside conductive layer is a polyester resin. It is most preferred that the backside conductive layer is a single phase mixture of a polyester resin as a "first" polymer and cellulose acetate butyrate as a "second" polymer."

It is preferred to use a mixture of polymers, that is, a first polymer that promotes adhesion to the support and a second polymer that promotes adhesion to the first layer. For example, when the support is a polyester film, and the backside conductive layer contains a polyvinyl acetal or a cellulose ester, then a preferred mixture of polymers in that conductive layer is a single-phase mixture of a polyester resin and a polyvinyl acetal such as polyvinyl butyral or cellulose ester such as cellulose acetate butyrate.

In another embodiment, the buried backside conductive layer is disposed between a "first" layer and a "second" layer directly adhering the support. In this embodiment, the "first" layer is directly above the backside conductive layer and is known herein: as a “first” layer, a “protective” layer, or a “protective topcoat” layer. It can be the outermost topcoat layer or have further layer(s) disposed thereon. This first layer comprises a film-forming polymer. The conductive layer immediately beneath the first layer comprises clusters of the metal oxide in a polymer that serves to promote adhesion of the backside conductive layer to the first layer as well as to a “second” layer immediately beneath it. This second layer is directly adhered to the polymeric support. The second layer directly adhered to the support comprises a mixture of two or more polymers. The first polymer serves to promote adhesion of the second layer directly to the polymeric support. The second polymer serves to promote adhesion of the second layer to the backside conductive layer.

It is preferred that the film-forming polymer of the first layer, the polymer of the backside conductive layer, and the second polymer of the second layer are the same or different polyvinyl acetal resins, polyester resins, cellulosic ester polymers, maleic anhydride-ester copolymers, or vinyl polymers. A preferred polymer is cellulose acetate butyrate.

It is preferred that the second, adhesion-promoting, layer use a single phase mixture of a polyester resin as a “first” polymer and a polyvinyl acetal such as polyvinyl butyral or cellulose ester such as cellulose acetate butyrate as a “second” polymer.”

In another embodiment, the buried backside conductive layer is disposed between a “first” layer and a “second” layer directly adhering to the support. In this embodiment, the first layer is directly above the backside conductive layer is known herein as a “first” layer, a “protective” layer, or a “protective topcoat” layer. It can be the outermost topcoat layer or have further layer(s) disposed thereon. This first layer comprises a film-forming polymer. The conductive layer immediately beneath the first layer comprises clusters of the non-acicular metal antimonate particles in a mixture of two or more polymers, a “first” polymer that serves to promote adhesion of the conductive layer to the second layer, and a “second” polymer that serves to promote adhesion of the conductive layer to the first layer.

It is preferred that the film-forming polymer of the first layer, and the “second” polymer of the backside conductive layer are the same or different polyvinyl acetal resins, polyester resins, cellulosic ester polymers, maleic anhydride-ester copolymers, or vinyl polymers. A preferred polymer is cellulose acetate butyrate.

It is also preferred that the polymer of the second, adhesion promoting, layer and the “first” polymer of the backside conductive layer are the same or different polyester resins.

Representative “first” polymers can be chosen from one or more of the following classes: polyvinyl acetals (such as polyvinyl butyral, polyvinyl acetal, and polyvinyl formal), cellulosic ester polymers (such as cellulose acetate, cellulose diacetate, cellulose triacetate, cellulose acetate propionate, hydroxymethyl cellulose, cellulose nitrate, and cellulose acetate butyrate), polyesters, polycarbonates, epoxies, rosin polymers, polyketone resin, vinyl polymers (such as polyvinyl chloride, polyvinyl acetate, polystyrene, polyacrylonitrile, and butadiene-styrene copolymers), acrylate and methacrylate polymers, and maleic anhydride ester copolymers. The polyvinyl acetals, polyesters, cellulosic ester polymers, and vinyl polymers such as polyvinyl acetate and polyvinyl chloride are particularly preferred, and the polyvinyl acetals, polyesters, and cellulosic ester polymers are more preferred. Polyester resins are most preferred. Thus, the adhesion-promoting polymers are generally hydrophobic in nature.

Representative “second” polymers include polyvinyl acetals, cellulosic polymers, vinyl polymers (as defined above for the “first” polymer), acrylate and methacrylate polymers, and maleic anhydride-ester copolymers. The most preferred “second” polymers are polyvinyl acetals and cellulosic ester polymers (such as cellulose acetate, cellulose diacetate, cellulose triacetate, cellulose acetate propionate, hydroxymethyl cellulose, cellulose nitrate, and cellulose acetate butyrate). Cellulose acetate butyrate is a particularly preferred second polymer. Of course, mixtures of these second polymers can be used in the backside conductive layer. These second polymers are also soluble or dispersible in the organic solvents described above.

It is preferred that the “first” and “second” polymers are compatible with each other or are of the same polymer class. One skilled in the art would readily understand from the teaching herein which polymers are “compatible with” or “of the same class” as those film-forming polymers. For example, it is most preferred to use a single phase mixture of a polyester resin as a “first” polymer and a cellulose ester such as cellulose acetate butyrate as a “second” polymer.” Many of the film-forming polymers useful in the first layer are described in other places herein (for example, binders used in imaging layers and or other conventional backside layers).

It is preferred that the first and second polymers are hydrophobic. However hydrophilic polymers can be used if they are soluble or dispersible in organic solvents.

The backside conductive and other backside layers are generally coated out of one or more miscible organic solvents including, but not limited to, methyl ethyl ketone (2-butanone, MEK), acetone, toluene, tetrahydrofuran, ethyl acetate, or any mixture of any two or more of these solvents. These hydrophobic organic solvents may contain a small amount (less that 10%, and preferably less than 5%) of a hydrophilic organic solvent such as methanol.or ethanol.

The buried backside conductive layers and at least one topcoat layer can be sequentially or simultaneously (wet-on-wet) coated using various coating procedures such as wire wound rod coating, dip coating, air knife coating, curtain coating, slide coating, or slot-die coating, extrusion coating. Simultaneous coating of multiple layers is preferred. These procedures are the same as those described above for the thermographic and photothermographic imaging layers.

The weight ratio of “first” polymer to “second” polymer in the backside conductive layer is generally from about 10:90 to about 40:60, and preferably from about 10:90 to about 30:70. A most preferred polymer combination is of polyester and cellulose acetate butyrate having a weight ratio of about 20:80.

The backside conductive layer can also include still other polymers that are not defined herein as first or second polymers. These additional polymers can be either hydrophobic polymers or organic-soluble hydrophilic polymers. Some hydrophilic polymers that maybe present include, but are not limited to, proteins or polypeptides such as gelatin and gelatin derivatives, polysaccharides, gum arabic, dextrans, polyacrylamides (including polymethacrylamides), polyvinyl pyrrolidones and others that would be readily apparent to one skilled in the art.

Other components of the backside conductive layer include materials that may improve coatability or adhesion, crosslinking agents (such as diisocyanates), surfactants and shelf-aging promoters.

The backside conductive layer may also include other addenda commonly added to such formulations including, but not limited to, shelf life extenders, antihalation dyes, colorants to control tint and tone, magnetic recording materials to record data, UV absorbing materials to improve light-box stability, and coating aids such as surfactants to achieve high quality coatings, all in conventional amounts. It is also useful to add inorganic matting agents such as the polysilicic acid particles as described in U.S. Pat. No. 4,828,971 (Przezdziecki), poly(methyl methacrylate) beads as described in U.S. Pat. No. 5,310,640 (Markin et al.), or polymeric cores surrounded by a layer of colloidal inorganic particles as described in U.S. Pat. No. 5,750,328 (Melpolder et al.). Alternatively, such materials can also be present in the "first" backside layer.

In one preferred embodiment, the "first" backside layer (usually referred to as a protective or topcoat layer) includes an antihalation composition, such as those antihalation compositions described above.

In addition to the clusters of metal oxide present in the buried backside conductive layer, other conductive materials may be present in either the buried backside conductive layer or other backside layers. Such compositions include fluorochemicals that are reaction products of $R_f$—$CH_2CH_2$—$SO_3H$ with amines wherein $R_f$ comprises 4 or more fully fluorinated carbon atoms as described in U.S. Pat. No. 6,699,648 (Sakizadeh et al.). Additional conductive compositions include one or more fluorochemicals described in U.S. Pat. No. 6,762,013 (Sakizadeh et al.). Both of these patents are incorporated herein by reference.

Formation of Metal Oxide Clusters

It is believed that the conductive efficiency of coatings of metal oxide is determined by the size of the:particles (or clusters of particles) produced during preparation of the coating formulation. Many metal oxides are provided from a supplier as dispersions in a suitable solvent, for example as a methanolic organosol dispersion (such as for the zinc antimonate particles). In such dispersions, the metal oxide particles generally have an average diameter of from about 15 to about 20 nm. Thus, they are considered "nanoparticles." The metal oxide particles can form clusters or agglomerates or return to their initial size depending on the method of incorporating them into a conductive layer formulation. It is preferred that the metal oxide (such as zinc antimonate) particles be introduced into a coating formulation in the form of clusters having an average size of from about 50 nm to about 2 μm. By intentionally "clustering" or agglomerating the metal oxide "nanoparticles." the coverage required to achieve efficient conductivity in the dried layer is therefore reduced.

If the metal oxide clusters are too small, the individual particles will not be close enough together in the dried conductive layer for efficient electrostatic discharge and the conductive efficiency will be low. On the other hand, if the particles produced are too large, then the particles will agglomerate and precipitate from the formulation. There are two places in the preparation of the buried backside conductive layer formulation that are critical to cluster formation. Inadequate mixing at either of these stages in the preparation of the backside conductive layer formulation will jeopardize the dispersion quality.

The electrical conduction pathway in a coated layer of metal oxide nano-particles is believed to be due to a combination of conduction within the particles, as well as between particles. Conductivity between particles occurs either because they are touching, or are in close proximity to each other. Generally in conductive metal oxides, conduction is higher between particles that are in contact with each other.

A percolation threshold for the conductive oxide particles occurs with increasing coverage that leads to a significant improvement in layer conductivity. This analysis is described by M. Lagues, R. Ober and C. Taupin, *J. Phys* 39, 1978, L487–L491, "Study of Structure and Electrical Conductivity in Microelmulsions. Evidence for percolation mechanism and phase inversion") and also reviewed by R. Zallen, *The Physics of Amorphous Solids*, Wiley, N.Y., 1983, pp.153–167.

To achieve high electrical conductivity of metal oxide particle coatings, it is therefore important to be able to detect the amount of particle clustering and the distance between (that is, the "gap" between) conductive species (either particles or clusters). Manufacturing methods that control the degree of particle clustering are also expected to effect conductivity, as the conduction pathway is expected to primarily follow the pathway formed by the close-packed particles of the clusters. While it is possible that the formation of such clusters may result in the formation of regions devoid of both clusters and particles, conduction can remain high as long as the clusters can form sufficiently connected pathways. Thus, the condition of having both a sufficient amount of connected pathways and at the same time a high number of gaps between clusters can co-exist in coatings, and yet still achieve high electrical conductivity.

For a given amount of metal oxide particles and a given coating thickness, the more clustering the better the conductivity. This is because clustering allows the formation of interconnected networks that allow for more efficient flow of charges than would a continuum of individual separated particles.

The Average Gap Density (that is, number of gaps), within a defined volume of a coating of metal oxide clusters can be used to measure the degree of clustering. We believe that if an Average Gap Density of at least 0.9 gaps/$\mu m^3$ with gaps of at least 0.25 μm between conductive particles or clusters are present, then the metal oxide particles will have formed sufficient clusters to provide a resistivity of $1\times10^{12}$ ohm/sq or less.

If a coating contains a higher amount of metal oxide, there will be fewer gaps. Therefore, the Average Gap Density can be normalized by dividing the Gap Density by the coating weight of the metal oxide. The thermally developable materials have a Normalized Average Gap Density of at least 0.03 (gaps/$\mu m^3$)/(mg/$ft^2$) is sufficient clusters to provide a resistivity of $1\times10^{12}$ ohm/sq or less.

The Average Cluster Size Distribution is a measure of the mean size of clusters of the metal oxide in the buried backside conductive layer. We believe that an Average Cluster Size Distribution of at least 0.38 μm provides clusters large enough to form sufficient connected pathways to provide a resistivity of $1\times10^{12}$ ohm/sq or less.

However, if a coating contains a higher amount of metal oxide, there will be more clusters. Therefore, the Average Cluster Size Distribution can be normalized by dividing the Average Cluster Size Distribution by the coating weight of the metal oxide. Thermally developable materials having a Normalized Average Cluster Size Distribution of greater than 0.012 (μM)/(mg/$ft^2$) provide clusters large enough to form sufficient connected pathways to provide a resistivity of $1\times10^{12}$ ohm/sq or less.

Methods for determining the Average Gap Density and Average Cluster Size are described below in relation to the Examples.

For a given amount of metal oxide particles and a given coating weight, the point at which there are just enough metal oxide clusters interconnected to complete a path for electrons to flow and resistivity just begin to fall is referred to as the percolation threshold. From a manufacturing point of view, one would want to be just above the percolation threshold.

We believe that the conductive efficiency of coatings of metal oxide particles (such as the preferred metal antimonate particles) is determined by the size and number of the clusters produced during preparation of the coating formulation. As noted above, the zinc antimonate nanoparticles in a methanolic organosol dispersion have an average diameter of from about 15 to about 20 nm. The nanoparticles can form clusters, agglomerate, or return to their initial size depending on the method of forming the final buried backside conductive layer formulation. The metal antimonate nanoparticles form clusters of preferably about 50 nm (0.05 μm) to about 2 μm and more preferably from about 0.1 to about 0.9 μm. By intentionally clustering the metal antimonate nanoparticles, the coverage required to achieve efficient conductivity in the final buried backside conductive layer is therefore reduced.

If the clusters produced are too small, they will not be close enough together in the final conductive layer for efficient electrostatic discharge. The conductive efficiency will be low. On the other hand, if the clusters produced are too large, they will agglomerate and precipitate from the formulation. There are two places in the preparation of the buried backside conductive layer formulation that are critical to cluster formation. Inadequate mixing at either of these stages in the preparation of the backside conductive layer formulation will jeopardize the dispersion quality.

It is preferred to gradually move the nano particles from a hydrophilic to a hydrophobic environment. Efficient mixing during the addition of a hydrophobic solvent (such as MEK) to the hydrophilic environment of the methanolic metal antimonate dispersion prevents formation of localized regions with high levels of MEK. We believe that regions of high MEK concentration destabilize the hydrophilic metal oxide/methanol dispersion resulting in precipitation of large agglomerates (greater than 5 μm) of metal oxide. If a significant amount precipitates, there will not be enough metal oxide to provide a conductive backside layer when coated.

We have found that high-shear stirring during the addition of the polymer binder premix solution to the metal oxide dispersion to complete the preparation of the stable backside conductive layer dispersion, either prevents the formation of, or breaks down, the desired metal oxide clusters back into the metal oxide nanoparticles of about 15 to about 20 nm. Adding a hydrophilic solvent can also reform these metal oxide nanoparticles. Coatings with nanoparticles of this size will have low conductive efficiency.

Keeping the Reynolds Number ($N_{RE}$) at less then about 20,000 during the addition of the polymer solution allows the formation of metal oxide clusters and permits the use of thin buried backside conductive layers using low levels of metal oxide. The Reynolds Number ($N_{RE}$) is important in analyzing any type of flow when there is substantial velocity gradient (shear). It is a dimensionless quantity that indicates the relative significance of the viscous effect compared to the inertia effect and is proportional to inertial force divided by viscous force. The Reynolds Number can be expressed as:

$$N_{RE} = \frac{10.754VD^2\rho}{\mu}$$

wherein V is the velocity of the stirring shaft in rpm, D is the diameter of the stirring blade in inches, ρ is the specific gravity of the fluid, and μ is the absolute viscosity of the fluid in centipoise (cP).

One skilled in the art would understand that the Reynolds Number required in these formulations is unique to the materials used. The Reynolds Number represents the critical point where the clusters are either not formed or break down. This critical point may change based on the solvents, polymers, or percent solids of the solution and can be determined for a given system as described below in Example 1.

One skilled in the art would also understand that there are other methods of cluster formation in addition to those described above. For example a dispersant could be chosen that selectively adsorbs on the metal oxide grains to create a more solvent repelling surface that would also induce cluster formation without adjusting the hydrophobicity of the solvent mixture.

Imaging/Development

The thermally developable materials can be imaged in any suitable manner consistent with the type of material using any suitable imaging source (typically some type of radiation or electronic signal for photothermographic materials and a source of thermal energy for thermographic materials). In some embodiments, the materials are sensitive to radiation in the range of from about at least 300 nm to about 1400 nm, and preferably from about 300 nm to about 850 nm. In other embodiments, the materials are sensitive to radiation at 700 nm or greater (such as from about 750 to about 950 nm).

Imaging can be achieved by exposing the photothermographic materials to a suitable source of radiation to which they are sensitive, including X-radiation, ultraviolet radiation visible light, near infrared radiation and infrared radiation to provide a latent image. Suitable exposure means are well known and include sources of radiation, including: incandescent or fluorescent lamps, xenon flash lamps, lasers, laser diodes, light; emitting diodes, infrared lasers, infrared laser diodes, infrared light-emitting diodes, infrared lamps, or any other ultraviolet, visible, or infrared radiation source readily apparent to one skilled in the art, and others described in the art, such as in *Research Disclosure*, September, 1996, item 38957. Particularly useful infrared exposure means include laser diodes, including laser diodes that are modulated to increase imaging efficiency using what is known as multi-longitudinal exposure techniques as described in U.S. Pat. No. 5,780,207 (Mohapatra et al.). Other exposure techniques are described in U.S. Pat. No. 5,493,327 (McCallum et al.).

Thermal development conditions will vary, depending on the construction used but will typically involve heating the imagewise exposed material at a suitably elevated temperature, for example, from about 50° C. to about 250° C. (preferably from about 80° C. to about 200° C. and more preferably from about 100° C. to about 200° C.) for a sufficient period of time, generally from about 1 to about 120 seconds. Heating can be accomplished using any suitable heating means. A preferred heat development procedure for photothermographic materials includes heating at from 130° C. to about 170° C. for from about 10 to about 25 seconds.

A particularly preferred development procedure is heating at about 150° C. for 15 to 25 seconds.

When imaging thermographic materials, the image may be "written" simultaneously with development at a suitable temperature using a thermal stylus, a thermal print-head or a laser, or by heating while in contact with a heat-absorbing material. The thermographic materials may include a dye (such as an IR-absorbing dye) to facilitate direct development by exposure to laser radiation.

Use as a Photomask

The thermographic and photothermographic materials can be sufficiently transmissive in the range of from about 350 to about 450 nm in non-imaged areas to allow their use in a method where there is a subsequent exposure of an ultraviolet or short wavelength visible radiation sensitive imageable medium. The heat-developed materials absorb ultraviolet or short wavelength visible radiation in the areas where there is a visible image and transmit ultraviolet or short wavelength visible radiation where there is no visible image. The heat-developed materials may then be used as a mask and positioned between a source of imaging radiation (such as an ultraviolet or short wavelength visible radiation energy source) and an imageable material that is sensitive to such imaging radiation, such as a photopolymer, diazo material, photoresist, or photosensitive printing plate. Exposing the imageable material to the imaging radiation through the visible image in the exposed and heat-developed thermographic or photothermographic material provides an image in the imageable material. This method is particularly useful where the imageable medium comprises a printing plate and the photothermographic material serves as an imagesetting film.

Thus, in some other embodiments wherein the thermographic or photothermographic material comprises a transparent support, the image-forming method further comprises, after step (A') or steps (A) and (B) noted above:

(C) positioning the imaged, heat-developed photothermographic or thermographic material between a source of imaging radiation and an imageable material that is sensitive to the imaging radiation, and (D) thereafter exposing the imageable material to the imaging radiation through the visible image in the exposed and heat-developed photothermographic material to provide an image in the imageable material.

The following examples are provided to illustrate the practice of the present invention and the invention is not meant to be limited thereby.

Materials and Methods for the Experiments and Examples:

All materials used in the following examples are readily available from standard commercial sources, such as Aldrich Chemical Co. (Milwaukee Wis.) unless otherwise specified. All percentages are by weight unless otherwise indicated. The following additional methods and materials were used.

CAB 171-15S and CAB 381-20 are cellulose acetate butyrate resins available from Eastman Chemical Co. (Kingsport, Tenn.).

CELNAX® CX-Z641M is an organosol dispersion containing 60% of non-acicular zinc antimonate nanoparticles in methanol. It was obtained from Nissan Chemical America Corporation (Houston, Tex.). All samples within each example were prepared using the same lot of CELNAX® CX-Z641M.

DESMODUR® N3300 is an aliphatic hexamethylene diisocyanate available from Bayer Chemicals (Pittsburgh, Pa.).

JEOL JEM-2000FX is a transmission electron microscope (TEM), manufactured by JEOL, USA (Peabody, Mass.).

MEK is methyl ethyl ketone (or 2-butanone).

PARALOID® A-21 is an acrylic copolymer available from Rohm and Haas (Philadelphia, Pa.).

SYLOID® 74X6000 is a synthetic amorphous silica that is available from Grace-Davison (Columbia, Md.).

SYLYSIA 310P is a synthetic amorphous silica available from Fuji Silysia (Research Triangle Park, N.C.).

VITEL® PE-2700B LMW is a polyester resin available from Bostik, Inc. (Middleton, Mass.).

Backcoat Dye BC-1 is cyclobutenediylium, 1,3-bis[2,3-dihydro-2,2-bis[[1-oxohexyl)oxy]methyl]-1H-perimidin-4-yl]-2,4-dihydroxy-, bis(inner salt). It is believed to have the structure shown below.

(BC-1)

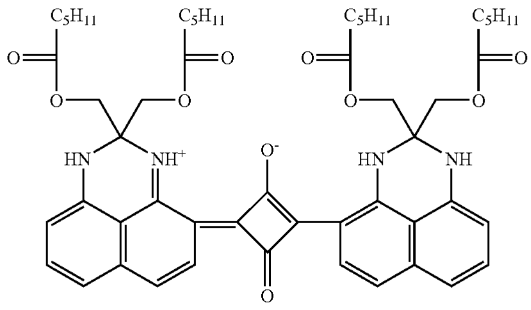

Ethyl-2-cyano-3-oxobutanoate is described in U.S. Pat. No. 5,686,228 and has the structure shown below.

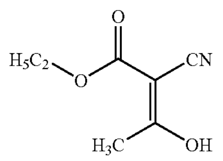

Vinyl Sulfone-1 (VS-1) is described in U.S. Pat. No. 6,143,487 and has the structure shown below.

(VS-1)

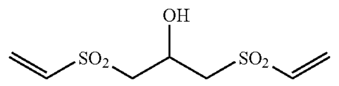

Acutance Dye AD-1 has the following structure:

(AD-1)

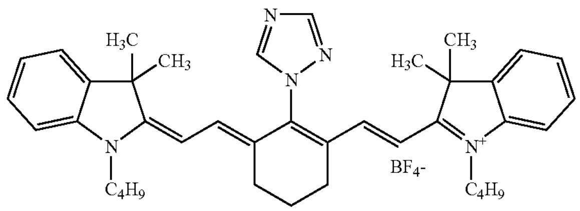

Tinting Dye TD-1 has the following structure:

(TD-1)

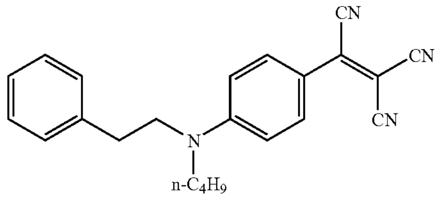

Resistivity Measurements:

The charge control performance of antistatic backside conductive layers can be reported in terms of their surface electrode resistivity (SER) as described in U.S. Pat. No. 6,689,546 (noted above). For the buried backside conductive layers of this invention, a better measuring technique is their water electrode resistivity (WER). For materials where the backside conductive layer is the surface layer, the WER and SER are essentially the same. For buried conductive layers however, WER measurement removes the influence of any protective overcoats on the measured resistivity. Although the advantages of the present invention are described in terms of WER, it would be apparent to one skilled in the art that the same advantages maybe demonstrated in terms of SER measurements.

Resistivity of antistatic coatings was measured using the "water electrode resistivity" (WER) test. In this test, antistatic performance is evaluated by measuring the internal resistivity of the overcoated electrically conductive antistatic layer using a salt bridge water electrode resistivity measurement technique. This technique is described in R. A. Elder *Resistivity Measurements on Buried Conductive Layers*, EOS/ESD. Symposium Proceedings, Lake Buena Vista, Fla., 1990, pp. 251–254, incorporated herein by reference. [EOS/ESD stands for Electrical Overstress/Electrostatic Discharge]. Typically, antistatic layers with WER values greater than about $1\times10^{12}$ ohm/square are considered to be ineffective at providing static protection for photographic imaging elements. We have also found WER measurements to be predictive of how an antistatic material will perform when used in a commercial product. Resistivity was measured in a room maintained at 70° F. (21.1° C.) and 50% relative humidity (RH) after samples had been acclimated for 18 to 24 hours.

Determination of Gap Density and Average Cluster Size Distribution:

The relationship between particle morphology and electrical conductivity within the coated metal oxide layers was determined by transmission electron microscopy (TEM) using a JEOL JEM-2000FX transmission electron microscope, operating at 200 kV accelerating voltage. Thin sections of coatings were made with a Reichert Ultracut S microtome using a diamond knife. The morphology of the metal oxide within the coatings was examined in these cross-sections with the viewing direction in the plane of the coatings. Because the individual conductive metal oxide nanoparticles are ~20 nm in diameter, direct observation of their clustering, is possible only if there is little overlap in the viewing direction from foreground and background particles and clusters. To avoid viewing such overlap, coated films were cross-sectioned to a thickness only a few multiples of the average particle diameter. It is important that the depth of the cross-sections is within 3×(~60 nm) of the nominal particle diameters (2× is preferable, and greater than 5× begins to cause unacceptable overlap). Only "grey-colored" cross-sections were used, as these were estimated to be ~60 nm deep (see L. D. Peachey, *J. Biophys. & Biochem. Cytol.* 1958, 40, 233–242). In order to avoid confusion from experimental artifacts generated by the microtome process, only coated regions containing >10 μm length of coated metal oxide layer were used to generate the particle morphology statistics.

The Average Gap Density between conductive species (particles or clusters) was measured from images obtained from the transmission electron micrographs of the microtomed films. Each sample showed at least a 10 μm length of coated metal oxide layer and was approximately 60 nm deep. These regions contained gaps between metal oxide clusters. The gap density was determined by counting the number of 0.25 μm gaps within a given volume of the microtomed film sections. We believe that a 0.25 μm gap (that is, a region devoid of particles and clusters) is sufficient to cause unacceptable conduction. In the Examples below, at least 10 such 10 μm long sections were examined to obtain the Average Gap Density shown in TABLES II and III below.

If a coating contains a higher amount of metal oxide, there would be fewer gaps. Therefore, the Average Gap Density was normalized by dividing the Average Gap Density by the coating weight of the metal oxide.

The Average Cluster Size distribution of the metal oxide clusters in the simultaneously coated buried backside conductive layer and the immediately adjacent backside topcoat layer was also measured from images obtained from the transmission electron micrographs of the microtomed films. Each sample showed at least a 10 μm length of coated metal oxide layer and was approximately 60 nm deep. These regions contained peaks and valleys at the morphology defined by the distribution of the metal oxide particles. The three highest peaks within this region were bracketed in a 0.25 μm "window." The average height of each peak within each window was determined. These three averages were then averaged. A similar determination was made for the valleys. The difference between the average peak height and average valley depth was taken as the average cluster size distribution. In the Examples below, at least 10 such 10 μm long sections were examined to obtain the average cluster size distribution shown in TABLES II and III below.

If a coating contained a higher amount of metal oxide, there would be more clusters. Therefore, the Average Cluster Size Distribution was normalized by dividing the Average Cluster Size Distribution by the coating weight of the metal oxide.

EXAMPLE 1

Effect of Mixing Shear on Resistivity

When production quantities of materials are prepared, the concentration of materials and stirring speed required for efficient mixing of the materials often results in shear conditions that are different from those involved for the preparation of laboratory quantities. As a result, the materials so produced can have properties different from those of laboratory-prepared samples. The following example demonstrates the effect of mixing shear on the resistivity of the resulting buried backside conductive layer.

Photothermographic Emulsion Formulation:

An infrared-sensitive photothermographic emulsion coating formulation was prepared using a silver salt homogenate prepared substantially as described in Col. 25 of U.S. Pat. No. 5,434,043 (noted above), incorporated herein by reference. The photothermographic emulsion formulation was then prepared substantially as described in Cols. 19–24 of U.S. Pat. No. 5,541,054 (Miller et al.) that is also incorporated herein by reference.

Photothermographic Emulsion Topcoat Formulation:

A topcoat was prepared for application over the photothermographic emulsion formulation with the following components:

| | |
|---|---|
| MEK | 86.92 weight % |
| PARALOID ® A-21 | 1.14 weight % |
| CAB 171-15S | 12.40 weight % |
| Vinyl Sulfone (VS-1) | 0.47 weight % |
| Benzotriazole (BZT) | 0.35 weight % |
| Acutance Dye (AD-1) | 0.19 weight % |
| Ethyl-2-cyano-3-oxobutanoate | 0.31 weight % |
| SYLYSIA 310P | 0.28 weight % |
| DESMODUR ® N3300 | 0.93 weight % |
| Tinting Dye TD-1 | 0.01 weight % |

Photothermographic Emulsion Carrier Layer Formulation:

A "carrier" layer formulation for the photothermographic emulsion and topcoat layers was prepared as described in U.S. Pat. No. 6,355,405 (Ludemann et al.).

Preparation of Photothermographic Coatings:

The photothermographic emulsion, topcoat, and carrier layer formulations were coated onto a 7 mil (178 μm) blue tinted poly(ethylene terephthalate) support using a precision multilayer coater equipped with an in-line dryer.

Buried Backside Conductive Layer Formulation:

A dispersion was prepared by adding 10.98 parts of MEK to 5.15 parts of CELNAX® CX-Z641M (containing 60% non-acicular zinc antimonate solids in methanol—3.09 parts net). The addition took place over 10 minutes. Stirring was maintained for 1.5 hours.

A polymer solution was prepared by dissolving 0.68 parts of VITEL®PE-2700B LMW and 2.72 parts of CAB 381-20 in 80.47 parts of MEK.

The polymer solution was added to the CELNAX® dispersion over 30 minutes with stirring. Various stirrer diameters and rotation speeds were used. The formulation was then stirred for an additional 1 hour. All final formulations had a viscosity of 12 (±0.05) cP and a specific gravity of 0.87 (±0.01).

Backside Topcoat Formulation:

A backside topcoat formulation was prepared by mixing the following materials:

| | |
|---|---|
| MEK | 88.81 weight % |
| CAB 381-20 | 11.0 weight % |
| SYLOID ® 74X6000 | 0.14 weight % |
| Antihalation Dye BC-1 | 0.071 weight % |

The buried backside conductive layer formulation and backside topcoat formulations were simultaneously coated onto the opposite side of the support to that containing the photothermographic coating. The buried backside conductive layer served as a carrier layer for the protective topcoat layer. A precision multilayer coater equipped with an in-line dryer was used. The dry coating weight of the backside topcoat layer was 0.37 g/ft$^2$ (3.97 g/m$^2$). The dry coating weight of the buried backside conductive layer was adjusted to achieve a Water Electrode Resistivity of 2.5×10$^{10}$ ohms/sq.

The results, shown below in TABLE I, demonstrate that the coating weight required to achieve a Water Electrode Resistivity of 2.5×10$^{10}$ ohms/sq sharply increases from between 21 to 24 mg/ft$^2$ to between 28.5 and 30 mg/ft$^2$ when the buried conductive layer is prepared with a Reynolds Number ($N_{RE}$) greater than from about 20,000 to about 23,000. $ZnSb_2O_6$ coating weights were determined by X-ray fluorescence.

TABLE I

| Sample | Shaft Velocity [rpm] | Blade Diameter [inches] | Reynolds Number [$N_{RE}$] | Coating Weight of $ZnSb_2O_6$ [mg/ft$^2$] |
|---|---|---|---|---|
| 1-1 | 345 | 3 | 2,419 | 22.5 |
| 1-2 | 345 | 3 | 2,419 | 22.5 |
| 1-3 | 445 | 3 | 3,118 | 22.5 |
| 1-4 | 445 | 3 | 3,118 | 24.2 |
| 1-5 | 80 | 10 | 6,237 | 24.0 |
| 1-6 | 145 | 10 | 11,325 | 24.0 |
| 1-7 | 145 | 10 | 11,325 | 23.3 |
| 1-8 | 104 | 12 | 11,694 | 21.0 |
| 1-9 | 104 | 12 | 11,694 | 23.0 |
| 1-10 | 104 | 12 | 11,694 | 22.5 |
| 1-11 | 93 | 22 | 11,694 | 22.5 |
| 1-12 | 150 | 12 | 16,839 | 22.5 |
| 1-13 | 150 | 12 | 16,839 | 22.5 |
| 1-14 | 50 | 22 | 18,866 | 24.0 |
| 1-15 | 50 | 22 | 18,866 | 23.3 |
| 1-16 | 62 | 22 | 23,387 | 30.0 |
| 1-17 | 23 | 36 | 23,387 | 28.5 |
| 1-18 | 75 | 36 | 75,774 | 28.7 |

EXAMPLE 2

Effect of Mixing Shear on Conductive Efficiency

Buried backside conductive layer and topcoat formulations were prepared, coated, and dried as described in Samples 1–3 and 1–18. Coating weights were adjusted so that both coatings had approximately the same buried backside conductive layer thickness. Measurements were made of sample properties as described above.

The results, shown in TABLES II and III below, again demonstrate that when the buried conductive layer is prepared with a Reynolds Number ($N_{RE}$) greater than from about 20,000 to about 23,000 buried backside conductive layers have a higher resistivity. Control Sample 2-2 contained a higher coating weight of $ZnSb_2O_6$ than Inventive Sample 2-1, which should reduce resistivity. Nevertheless, Inventive sample 2-1 had a lower resistivity. Thus, clustering of the $ZnSb_2O_6$ particles provides conductive layers with more conductive efficiency.

The size of the $ZnSb_2O_6$ clusters in the buried backside conductive layer coating formulation was measured by light scattering using a Microtrac X-100 UPA particle analyzer made by Microtrac, Inc. (Montgomeryville, Md.). Control Sample 2-2 contained clusters having a mean volume diameter of 0.284 μm with 90% of the clusters having a mean volume diameter less than 0.494 μM. Inventive Sample 2-1 contained clusters having a mean volume diameter of 0.785 μm with 90% of the clusters having a mean volume diameter less than 0.985 μm. The smaller particle size of Control Sample 2-1 is reflected is its poorer conductive properties.

Table III illustrates that more clusters are formed when formulations are prepared at a low shear rate and that these clusters are maintained in the coated material. The normalized average gap density is higher in Inventive Sample 2-1 because more clusters have a larger normalized average size. This leads to improved conductivity.

TABLE II

| Sample | Coating Weight of $ZnSb_2O_6$ [mg/ft$^2$] | Reynolds Number [$N_{RE}$] | WER [ohm/sq] | Mean Volume Diameter | <90% Volume Diameter |
|---|---|---|---|---|---|
| 2-1 (Invention) | 28.6 | 3,118 | $1.17 \times 10^{10}$ | 0.785 | 0.985 |
| 2-2 (Control) | 32.87 | 75,774 | $5.2 \times 10^{10}$ | 0.284 | 0.494 |

TABLE III

| Sample | Average Gap Density [Gaps/μm$^3$] | Normalized Average Gap Density of Coated $ZnSb_2O_6$ [(Gaps/μm$^3$)/(mg/ft$^2$)] | Average Cluster Size Distribution [μm] | Normalized Average Cluster Size Distribution of coated $ZnSb_2O_6$ [μm/(mg/ft$^2$)] |
|---|---|---|---|---|
| 2-1 (Invention) | 1.87 | 0.065 | 0.44 | 0.0154 |
| 2-2 (Control) | 0.32 | 0.010 | 0.32 | 0.0097 |

The invention has been described in detail with particular reference to certain preferred embodiments thereof, but it will be understood that variations and modifications can be effected within the spirit and scope of the invention.

The invention claimed is:

1. A method of making a stable dispersion of a conductive hydrophilic metal oxide comprising:

A) adding a dispersion of nanoparticles of a conductive hydrophilic metal oxide in a first solvent to a mixing vessel, B) adding a second, hydrophobic, solvent to said mixing vessel with sufficient agitation to maintain said metal oxide nanoparticles in dispersion or in clusters having an average size of less than 1 μm, and C) adding a binder premix comprising a binder in said second solvent to said mixing vessel with a shear rate sufficient to allow growth of clusters of said metal oxide nanoparticles to an average size of 1 μm or less to form a stable dispersion of said metal oxide clusters, wherein steps B and C can be carried out sequentially or simultaneously after step A.

2. The method of claim 1 wherein said first solvent is water or a water-miscible alcohol and said hydrophilic conductive metal oxide is a non-acicular metal antimonate having a composition represented by the following Structure I or II:

$$M^{+2}Sb^{+5}{}_2O_6 \quad (I)$$

wherein M is zinc, nickel, magnesium, iron, copper, manganese, or cobalt, $$M_a{}^{+3}Sb^{+5}O_4 \quad (II)$$

wherein $M_a$ is indium, aluminum, scandium, chromium, iron, or gallium.

3. The method of claim 2 wherein said hydrophilic conductive metal oxide is composed of zinc antimonate ($ZnSb_2O_6$).

4. The method of claim 1 wherein said second solvent is a nonpolar organic solvent.

5. The method of claim 1 wherein step C is carried out with a shear rate sufficient to allow growth of clusters of said metal oxide nanoparticles to an average size of from about 50 nm to about 1 μm.

6. The method of claim 1 wherein steps B and C are carried out sequentially.

7. The method of claim 1 wherein said binder comprises a single-phase mixture of a polyester resin with either polyvinyl butyral or cellulose acetate butyrate.

8. The method of claim 1 further comprising filtering said stable dispersion of said metal oxide clusters.

9. A method of making a stable dispersion of a conductive hydrophilic metal oxide comprising:

A) adding a dispersion of nanoparticles of zinc antimonate ($ZnSb_2O_6$) in an alcoholic solvent to a mixing vessel, B) adding methyl ethyl ketone to said mixing vessel with sufficient agitation to maintain said zinc antimonate nanoparticles in dispersion or in clusters having an average particle size of from about 50 nm, to about 1 μm, and C) adding a binder premix comprising a single phase mixture of a polyester resin with either polyvinyl butyral or cellulose acetate butyrate, in methyl ethyl ketone to said mixing vessel with a shear rate having a Reynolds number ($N_{RE}$) of less than from about 20,000 to about 23,000 to allow growth of clusters of said zinc antimonate nanoparticles to an average size of from about 50 nm to about 1 μm or less to form a stable dispersion of said zinc antimonate clusters, wherein steps B and C are carried out sequentially after step A.

* * * * *